US011989969B2

(12) United States Patent
Li et al.

(10) Patent No.: US 11,989,969 B2
(45) Date of Patent: May 21, 2024

(54) BIOMETRIC INFORMATION IMAGING DEVICE

(71) Applicant: ZKTeco USA, Alpharetta, GA (US)

(72) Inventors: Zhinong Li, East Brunswick, NJ (US); Xiaowu Zhang, East Brunswick, NJ (US)

(73) Assignee: ZKTECO USA, Alpharetta, GA (US)

( * ) Notice: Subject to any disclaimer, the term of this patent is extended or adjusted under 35 U.S.C. 154(b) by 66 days.

(21) Appl. No.: 17/349,409

(22) Filed: Jun. 16, 2021

(65) Prior Publication Data

US 2021/0406572 A1    Dec. 30, 2021

Related U.S. Application Data

(60) Provisional application No. 63/044,527, filed on Jun. 26, 2020.

(51) Int. Cl.
| | |
|---|---|
| *H04N 5/225* | (2006.01) |
| *G02B 5/00* | (2006.01) |
| *G06V 40/10* | (2022.01) |
| *G06V 40/13* | (2022.01) |
| *G06V 40/145* | (2022.01) |
| *H04N 23/55* | (2023.01) |
| *H04N 23/56* | (2023.01) |
| *G06V 40/14* | (2022.01) |

(52) U.S. Cl.
CPC .......... *G06V 40/145* (2022.01); *G02B 5/003* (2013.01); *G06V 40/10* (2022.01); *G06V 40/1318* (2022.01); *H04N 23/55* (2023.01); *H04N 23/56* (2023.01); *G06V 40/14* (2022.01)

(58) Field of Classification Search
CPC ...... A61F 5/445; G06V 10/147; G06V 40/10; G06V 40/1318; G06V 40/14; G06V 40/145; G02B 5/003
See application file for complete search history.

(56) References Cited

U.S. PATENT DOCUMENTS

| | | | |
|---|---|---|---|
| 2008/0175444 A1* | 7/2008 | Maro | G06V 40/1324 |
| | | | 359/834 |
| 2011/0007143 A1* | 1/2011 | Mugica | G06V 40/10 |
| | | | 340/5.83 |
| 2018/0373913 A1* | 12/2018 | Panchawagh | G01S 7/52079 |
| 2020/0218767 A1* | 7/2020 | Ritchey | G06F 3/147 |
| 2021/0361233 A1* | 11/2021 | Wilson | A61B 5/6898 |

FOREIGN PATENT DOCUMENTS

| | | | | |
|---|---|---|---|---|
| CN | 212365012 U | * | 1/2021 | |
| WO | WO-2016162479 A1 | * | 10/2016 | G06F 21/32 |

\* cited by examiner

*Primary Examiner* — Md N Haque
(74) *Attorney, Agent, or Firm* — Venable LLP

(57) ABSTRACT

Provided is a biometric information imaging module, used for imaging palm veins, and method of using same. The imaging module includes a housing with a cover attached to a top of the housing; a lens assembly with a lens for taking images provided in the housing; a light shielding structure provided around at least part of the lens of the lens assembly for shielding the lens from light reflected from the cover; and an image sensor to convert light focused by the lens assembly to photoelectric conversion to an electrical signal. The lens assembly is attached to a first circuit board and the light shielding structure is connected to a second circuit board in the housing.

15 Claims, 34 Drawing Sheets

BIOMETRIC INFORMATION IMAGING DEVICE

CROSS REFERENCE TO RELATED APPLICATION

This application claims priority to U.S. Provisional Application No. 63/044,527, filed Jun. 26, 2020, the entire contents of which is herein incorporated by reference in its entirety.

BACKGROUND

Field

The present disclosure is generally related to a biometric device for obtaining images of a palm, including palm veins.

Description of Related Art

Generally, use of biometric devices that perform authentication by analyzing images of biometric information, such as palm veins, palm prints, and/or fingerprints, are known.

SUMMARY

It is an aspect of this disclosure to provide a biometric information imaging module for imaging palm veins including: a housing with a cover attached to a top of the housing; a lens assembly comprising a lens for taking images provided in the housing, the lens assembly being attached to a first circuit board; a light shielding structure provided around at least part of the lens of the lens assembly for shielding the lens from light reflected from the cover, the light shielding structure being connected to a second circuit board; and an image sensor to convert light focused by the lens assembly to photoelectric conversion to an electrical signal. In accordance with embodiments, the second circuit board is provided relatively above the first circuit board when the imaging module is positioned for use. The imaging module may also include a proximity detection sensor to determine a target in proximity and/or approaching the cover of the module. In embodiments, the imaging module further includes: one or more light sources for providing light attached to the second circuit board on opposite sides of the light shielding structure; and a lamp cup assembly provided around each light source and attached to the second circuit board. The light shielding structure shields the lens from the light of the light source(s) and each lamp cup assembly guides the light emitted from the light source(s) in a particular direction.

Another aspect of this disclosure is a method of using the biometric information imaging module, the method comprising: receiving, in the lens assembly, reflected light through the cover from a target; sensing via the image sensor the reflected light from said lens assembly; and converting with the image sensor an optical signal from the light focused by the lens assembly via photoelectric conversion to an electrical signal for processing Other aspects, features, and advantages of the present disclosure will become apparent from the following detailed description, the accompanying drawings, and the appended claims.

DETAILED DESCRIPTION

As evident by the drawings and below description, this disclosure relates to an imaging and collection module 200, or biometric information imaging device, that is, for example, a biometric authentication apparatus that is able to capture an image of biometric information such as palm veins. The imaging and collection module 200 is designed such that a user places his/her palm onto a top surface of the module 200 so that image(s) may be captured and analyzed.

Figure 1:
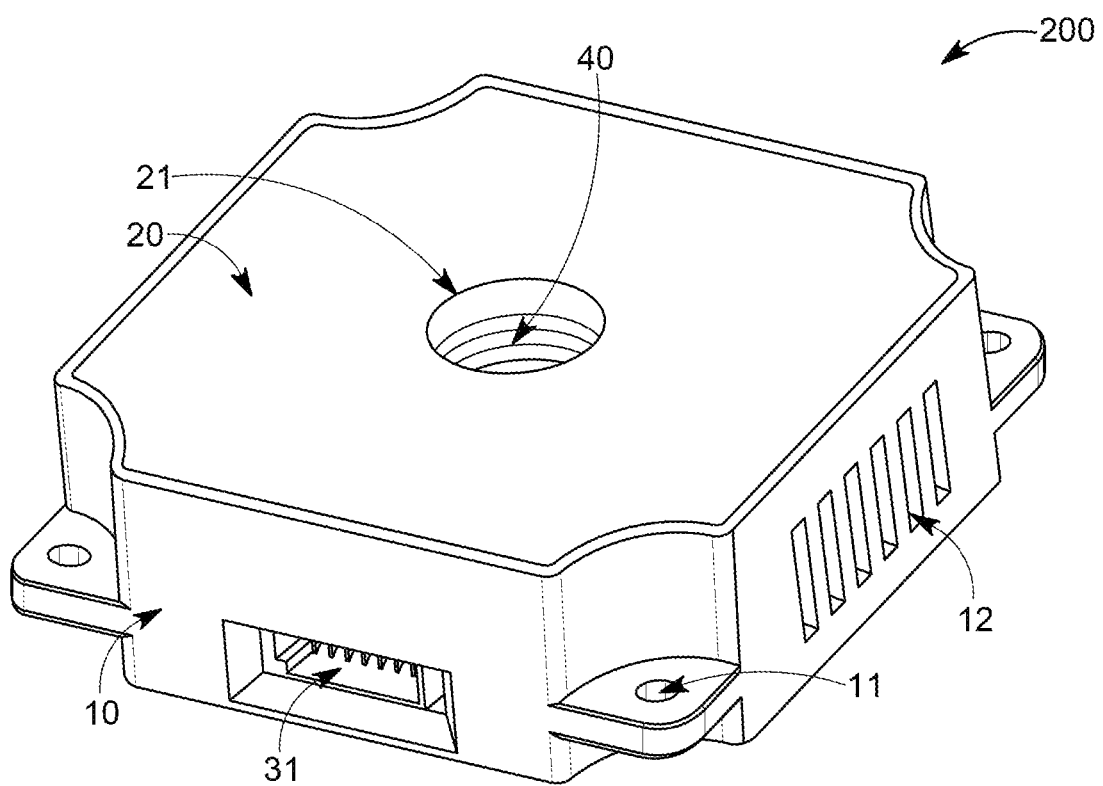
FIG. 1 shows an overhead side view a biometric information imaging and collection device in accordance with an embodiment of the disclosure.
Figure 4:
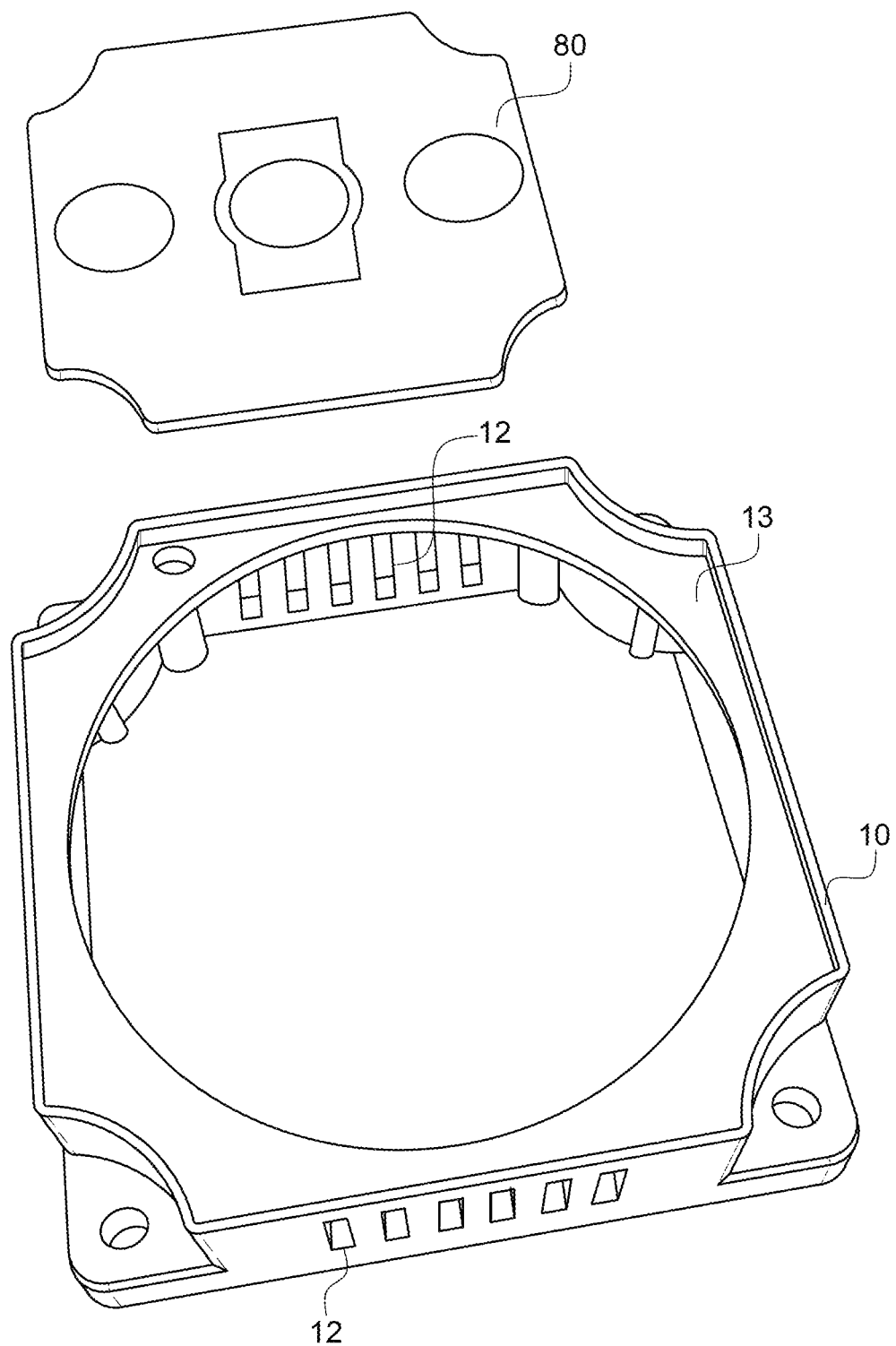
FIG. 4 shows a top view of an upper circuit board and the housing of the biometric information imaging and collection device of FIG. 1, in accordance with an embodiment of this disclosure.

The imaging and collection module 200 includes a housing 10, which may be in the form of a frame, and a cover 20. The housing 10 accommodates an imaging unit (e.g., camera), or lens assembly 40, therein, as well as an assembly of circuit boards therein. The housing 10 or frame may be generally in the shape of a square with beveled, rounded, and/or curved corners, such as shown in FIG. 1 and FIG. 4, when viewed from above, in accordance with an embodiment. However, the shape of the housing 10 is not intended to be limiting and may be in the general form of a rectangle, polygon, circle, oval, or other shape. Fixing holes 11 may be provided in one or more corners of the housing 10 for fixing the imaging and collection module 200 to another device, e.g., via fasteners (for example, screws) being placed through the fixing holes 11 and fastened to the other device. In the exemplary illustrative embodiment, there are four (4) fixing holes 11 at the four corners of the housing 10, which are used to fix the collection device to the specific form of equipment. One or more sides of the housing 10 or frame may be provided with heat dissipation holes 12 for air convection to enhance the heat dissipation effect. In one embodiment, two sides of the housing 10, e.g., opposite sides (e.g., left and right sides of the frame) have heat dissipation holes 12 in the form of grids or openings 23 to allow enhanced convection cooling effect of the imaging device.

Figure 2:
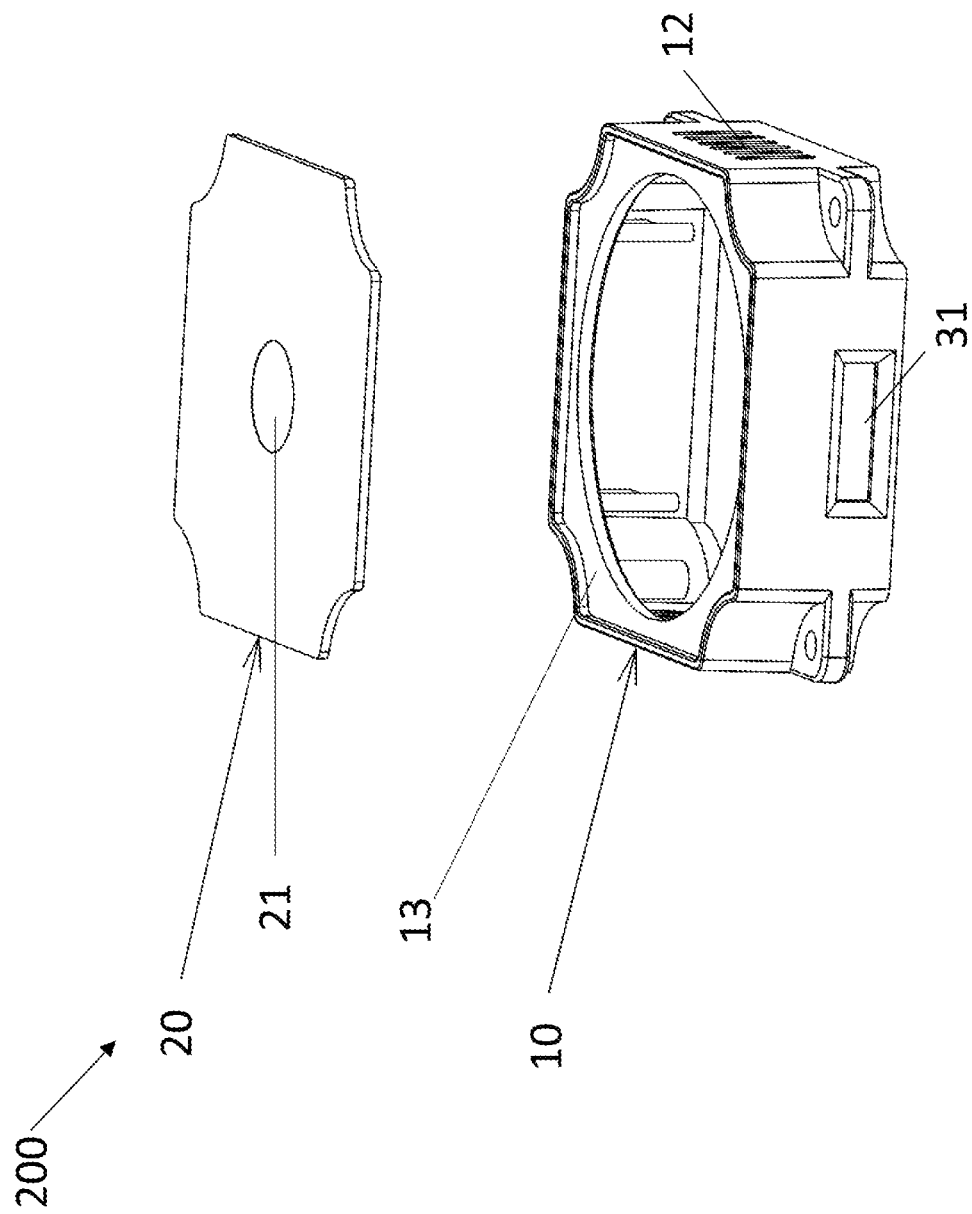
FIG. 2 shows an overhead side view of a cover and a housing of the biometric information imaging and collection device of FIG. 1, in accordance with an embodiment.
Figure 3:
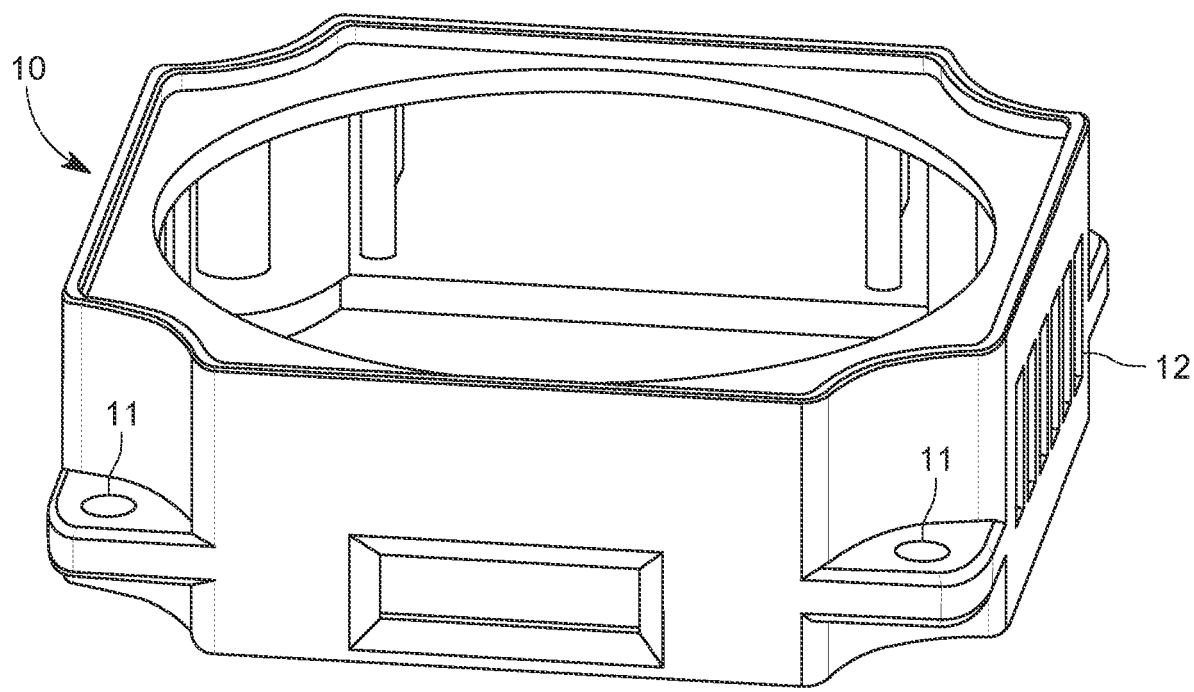
FIG. 3 shows an overhead side view of the housing of FIG. 2.

Cover 20 is provided on top of the housing 10, and thus may also be referred to as a top cover. Cover 20 is designed for a user to place a palm thereon to facilitate imaging and also to prevent dust from entering the device and at the same time to improve the aesthetics of the imaging device. Cover 20 may be provided in the form of a plate, for example. In accordance with embodiments, the cover 20 may be made of an acrylic or glass material, and/or may be completely transparent or transparent to light in a specific wavelength range. Cover 20 may be provided in a similar shape as the housing 10, e.g., square, rectangle, polygon, circle, oval, or other shape. For example, in the exemplary illustrated embodiment, the cover 20 may be generally in the form of a square with beveled, rounded, and/or curved corners. However, such shapes and/or configurations are not intended to be limiting. For example, the cover 20 may be polygonal, rectangular, square, round, ovular, or circular, despite the shape of the housing 10. In one embodiment, the cover 20 may be secured onto a concave part 13 (see FIG. 2, for example) or depressed portion or recess provided along an inner peripheral edge on an upper surface of the body of the frame or housing 10, using, for example, strong double-sided adhesive tape 14, glue, mechanical fasteners, a snap fit connection, or the like, or any other means for securing the cover 20 to the housing 10, without any intention of being limiting to the examples provided herein. A transparent area 21 is provided in a center of the cover 20 at the corresponding position of the middle lens assembly 40 (around the optical axis of lens 42), to increase the intensity of the reflected light, due to a coating treatment that may be provided on the remainder of the cover plate. For example, the area 21 may be made of a transparent material, while the surrounding portions of the cover 20 are shaded. The area 21 may be round or circular and formed at a center of the housing 10 when viewed in a plane or from the top of the imaging and collection module 200, in accordance with an embodiment. In one embodiment, the diameter of the area 21 on the cover corresponds to a diameter of the lens 42 of lens assembly 40. However, the size and/or shape of the area 21 in cover 20 is not intended to be limited. The area 21 may be of different size and/or shape (e.g., polygonal) as compared to the lens, for example. The area 21 may be, in some embodiments, a hole or opening in the cover 20.

In accordance with embodiments, the parameters of the camera and lens are supplemented. For example, the resolution of the camera is 320*240 or higher, in accordance with an embodiment. In one embodiment, the resolution of the camera is 640*480. In accordance with an embodiment, the FOV of the lens is between 50-130 degrees. In one embodiment, the FOV of the lens is 120 degrees.

According to one embodiment, included in the housing 10, and thus the imaging and collection module 200, in addition to the imaging unit/lens assembly 40 (which is described in greater detail below), are at least one light source 100 that emits light through the top cover 20, at least one light guide body or lamp cup assembly 50 that guides the light emitted from the light source 100 in a particular direction, and a light shielding structure 60 that acts as a light blocking body to block light around the lens assembly 40/imaging device, e.g., from light sources 100. See, for example, FIGS. 5, 6, 7, and 8 showing such features. For example, light from the light sources 100 may be reflected from the top cover 20 and into the lens 42 and image sensor 110, depending on the distribution and angle of light from the light sources 100, which is undesirable as it may cause interference to the lens 42 and readings. Accordingly, the lamp cup assembly(ies) 50 and/or light shielding structure 60, or both, may be used to reduce and/or substantially eliminate any undesired feedback or reflection of light therefrom.

Figure 5:
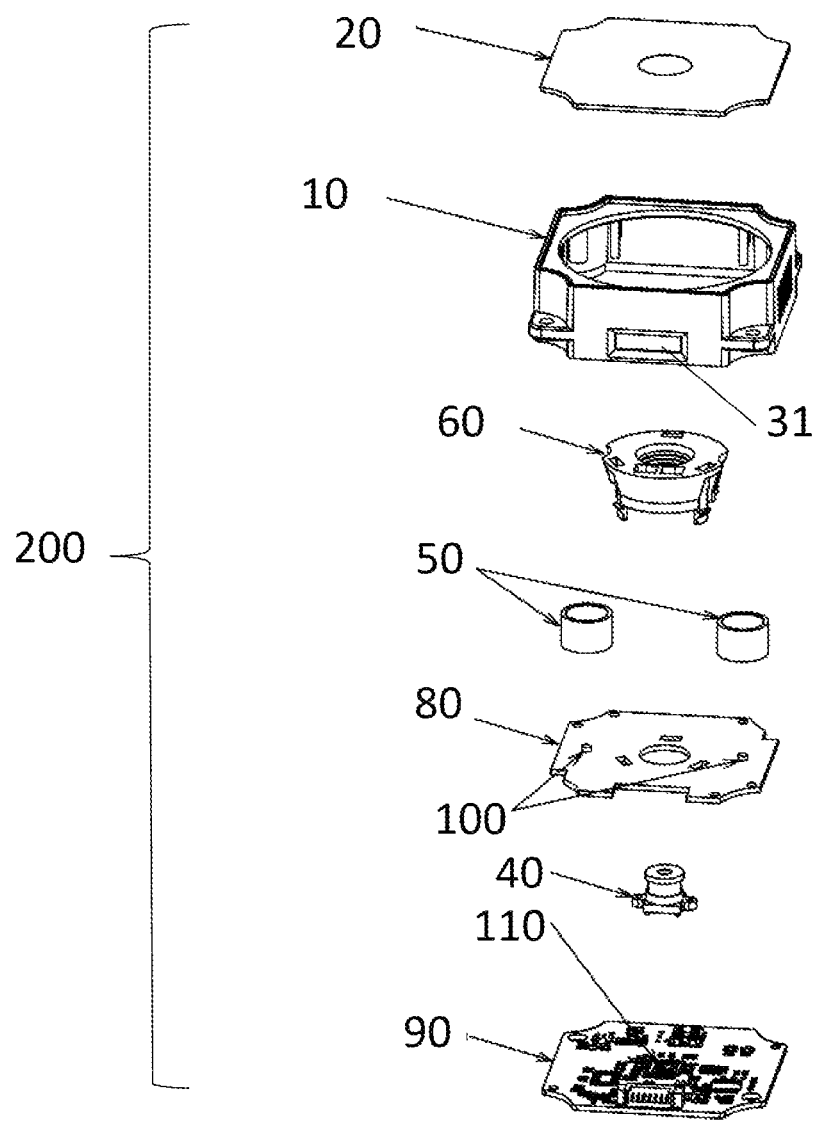
FIGS. 5 and 6 each show an exploded view of parts in the biometric information imaging and collection device of FIG. 1, in accordance with embodiments.
Figure 6:
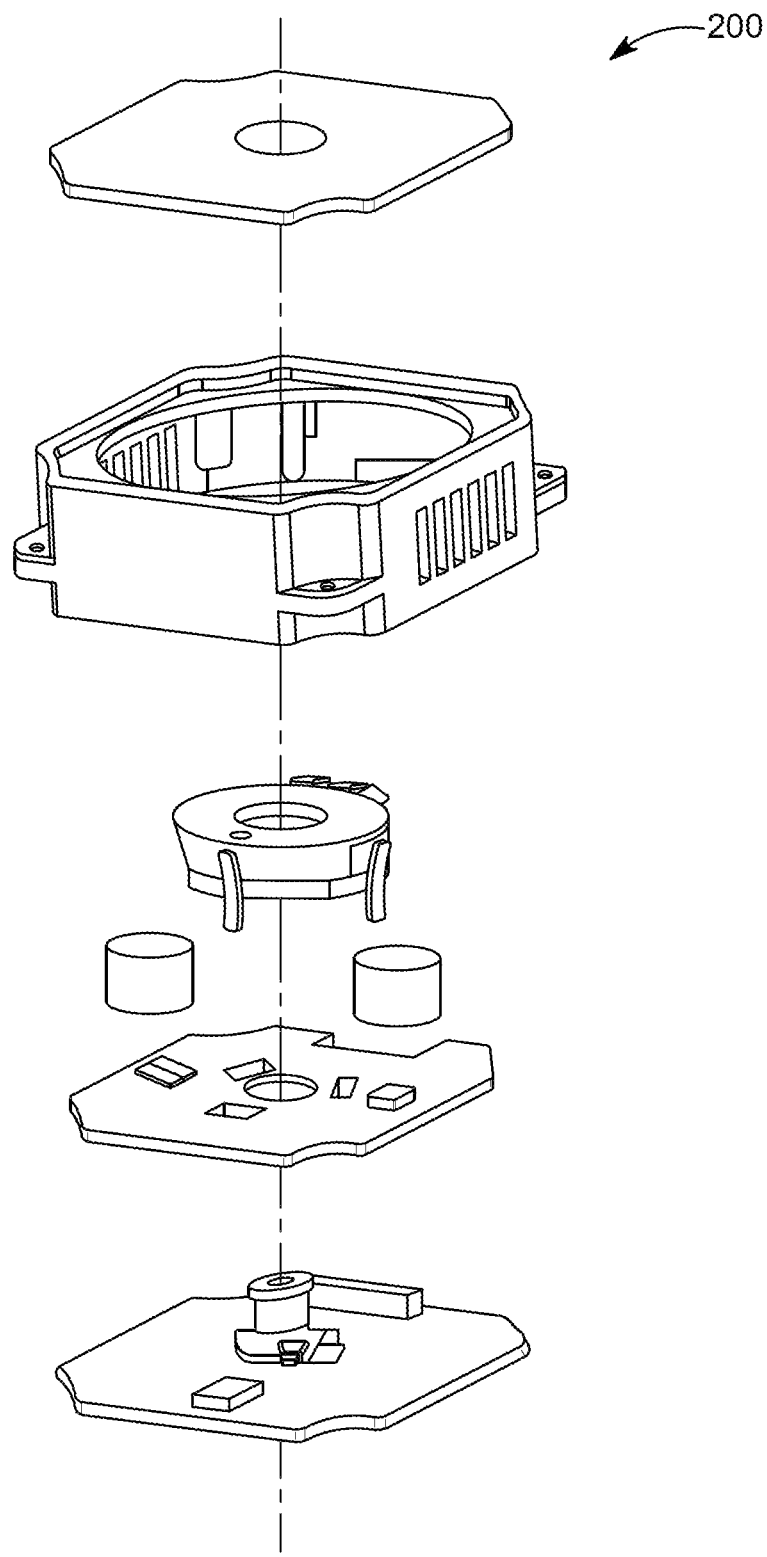
Figure 7:
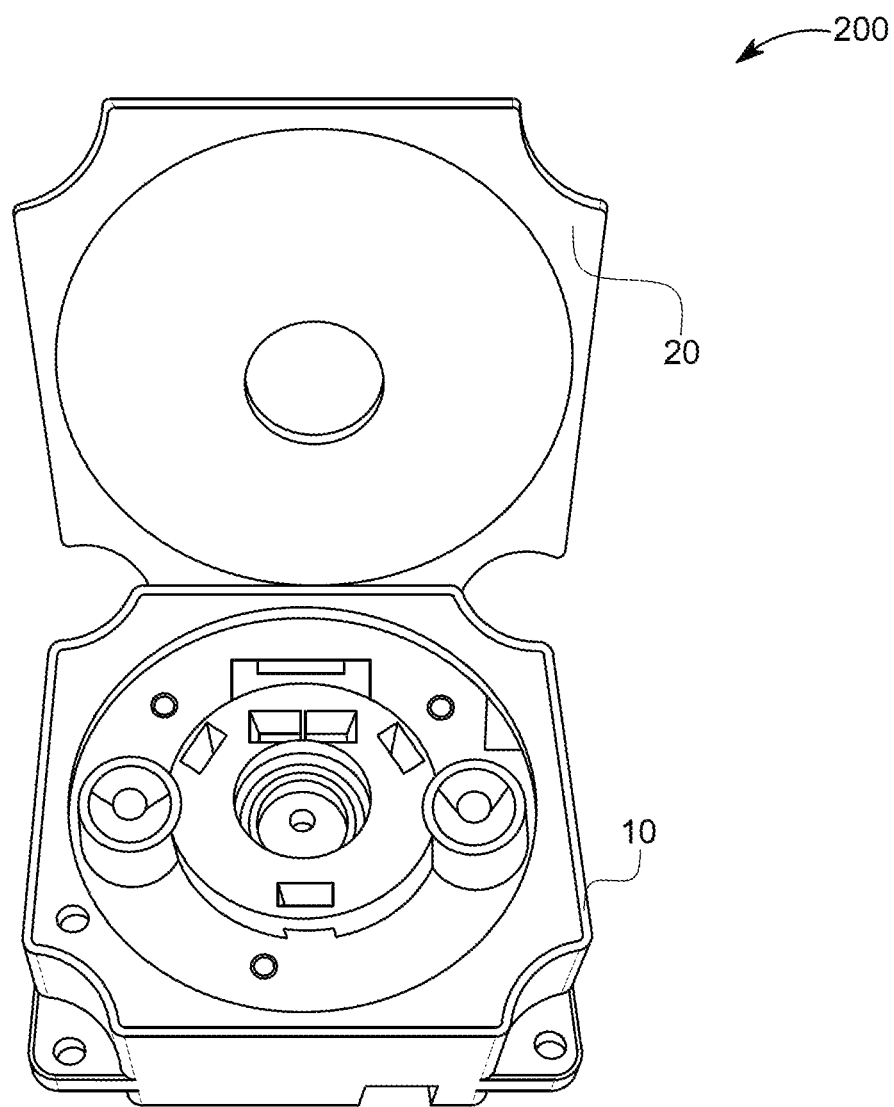
FIG. 7 shows an inside of the biometric information imaging and collection device, with the cover opened.
Figure 8:
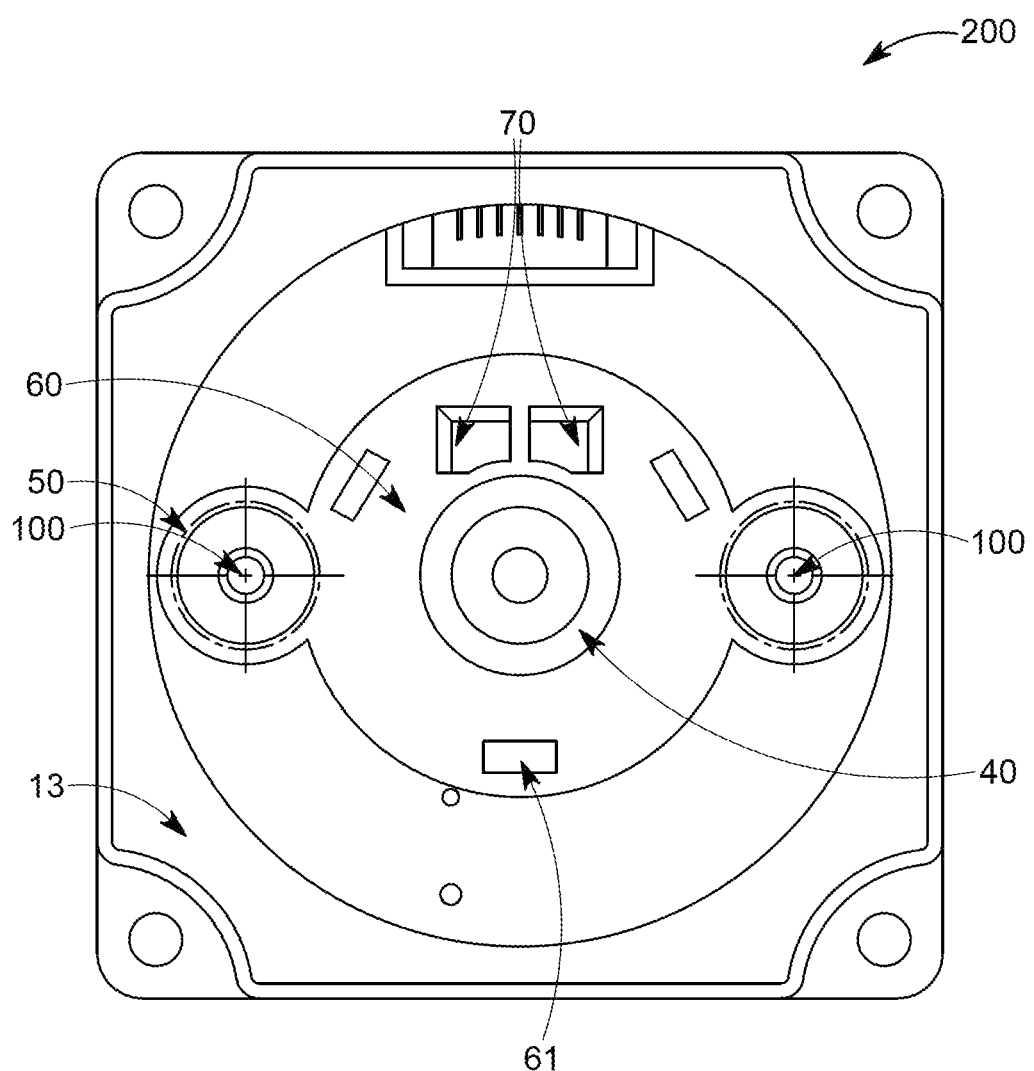
FIG. 8 shows top view of parts within the biometric information imaging and collection device, in accordance with an embodiment.
Figure 9:
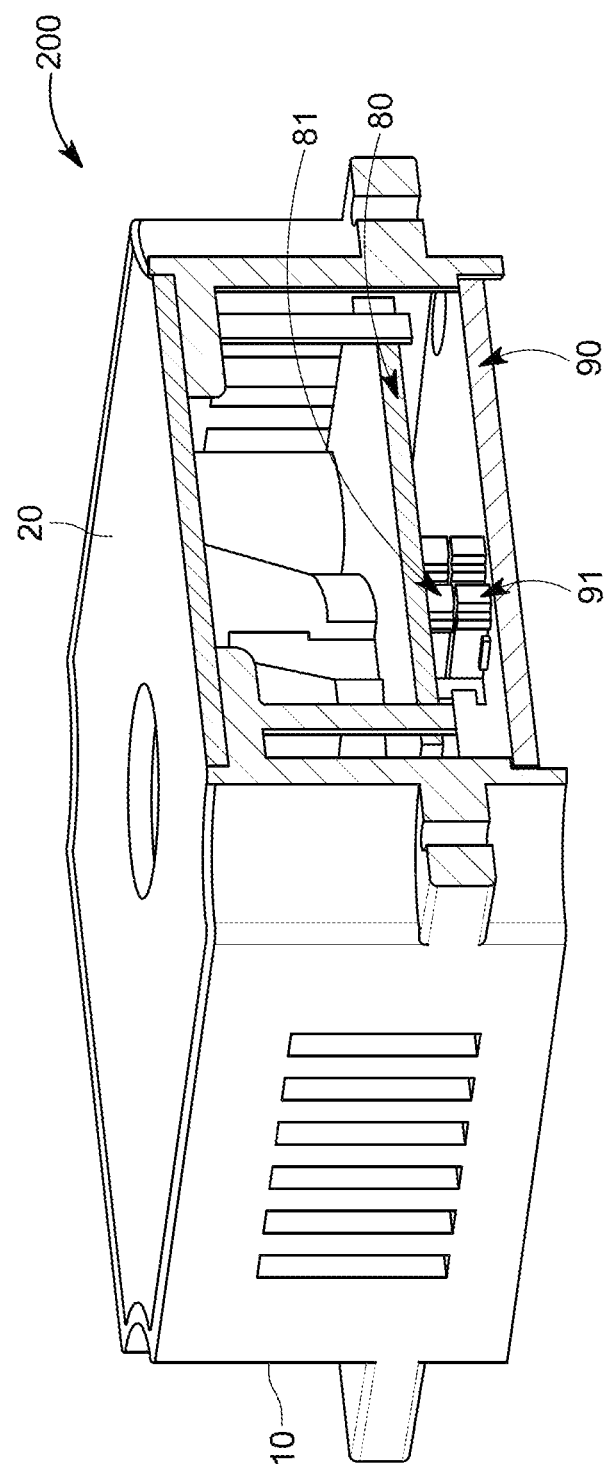
FIG. 9 shows a partial cross-sectional view of a side of the biometric information imaging and collection device of FIG. 1, in accordance with an embodiment of this disclosure.
Figure 12:
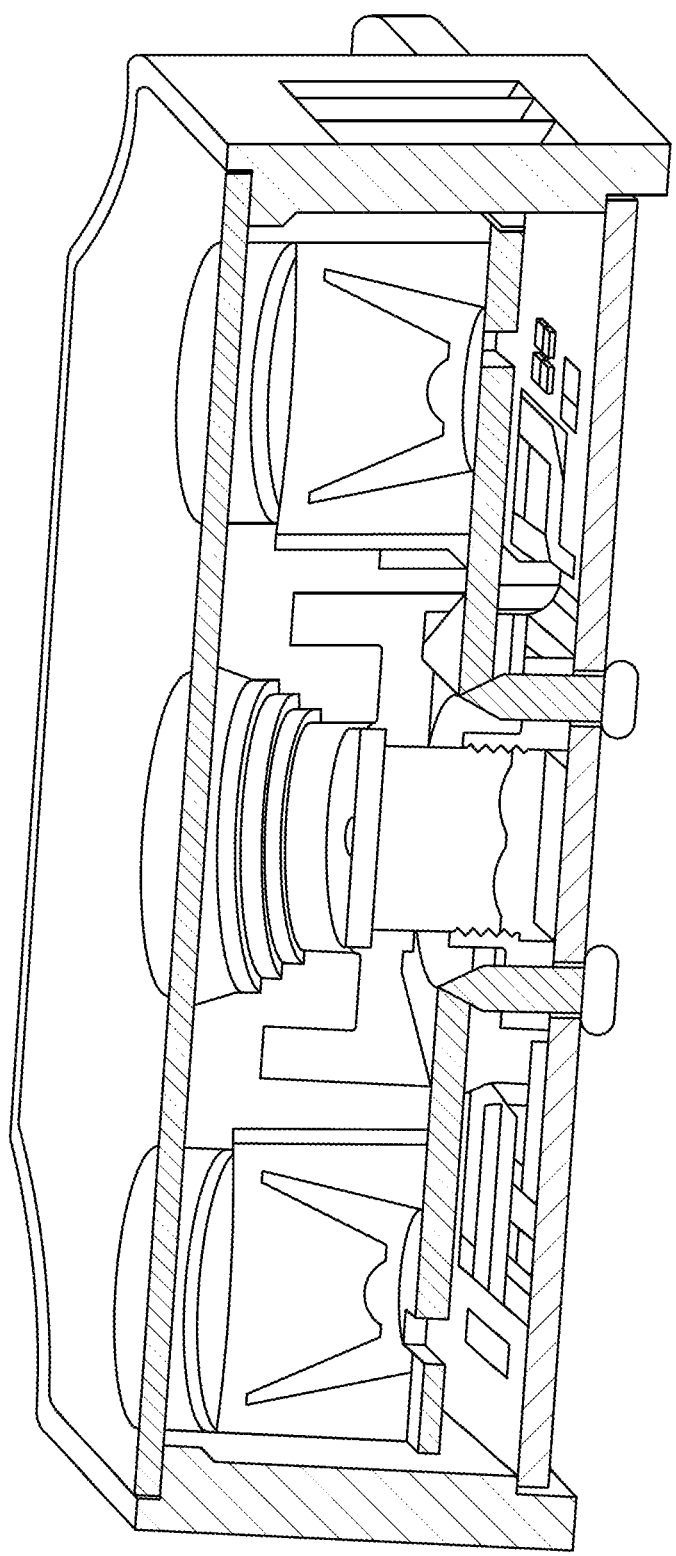
FIG. 12 shows an alternative view of the cross-sections of FIGS. 10-11.
Figure 13:
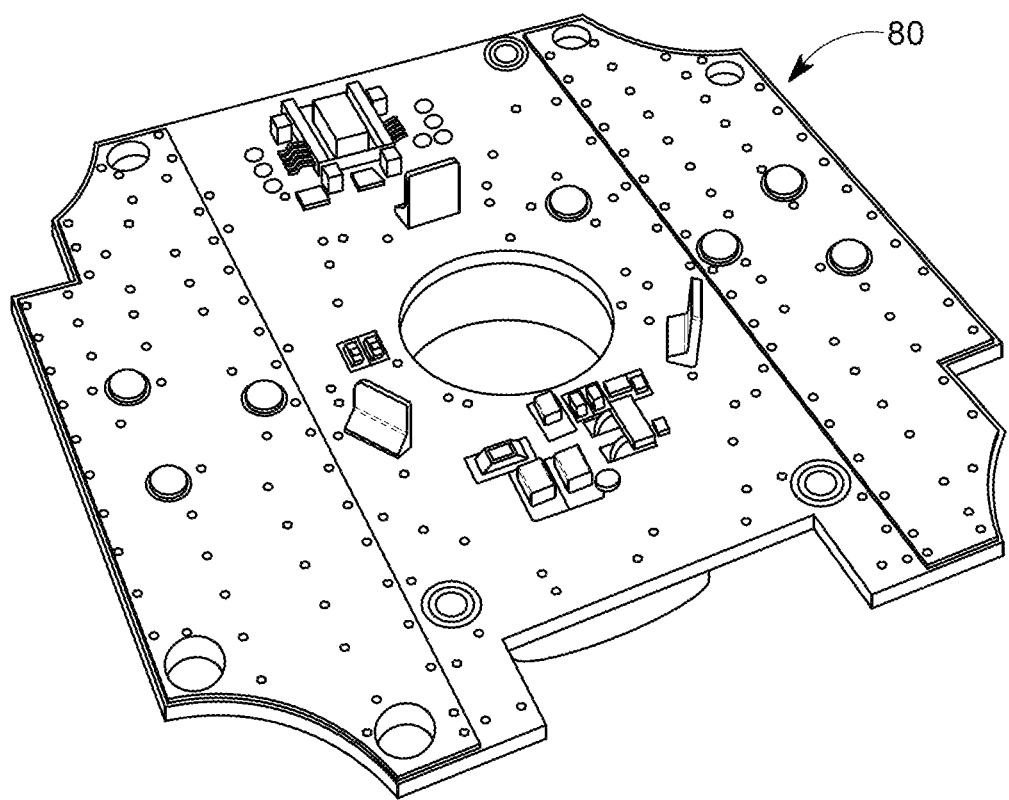
FIG. 13 shows a top view of an upper circuit board used in the device of FIG. 1.
Figure 14:
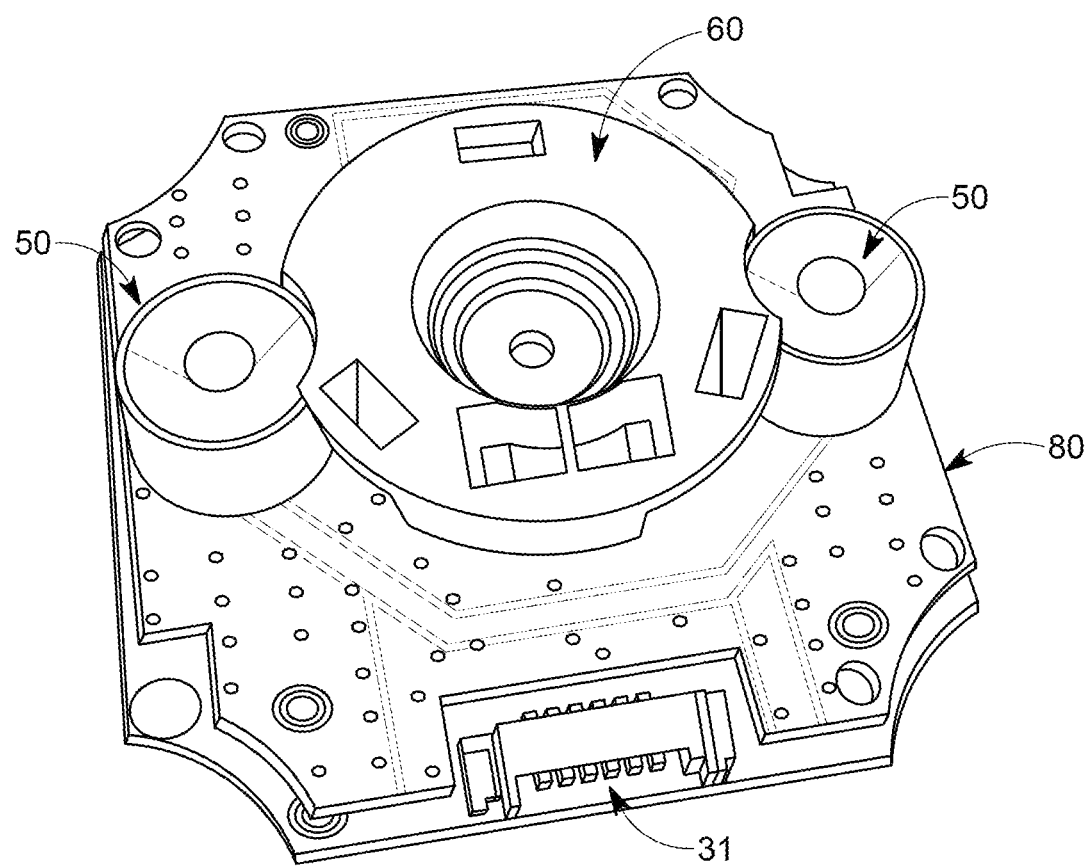
FIG. 14 shows lamp cup assemblies and light shielding structure provided on the circuit board of FIG. 13.
Figure 15:
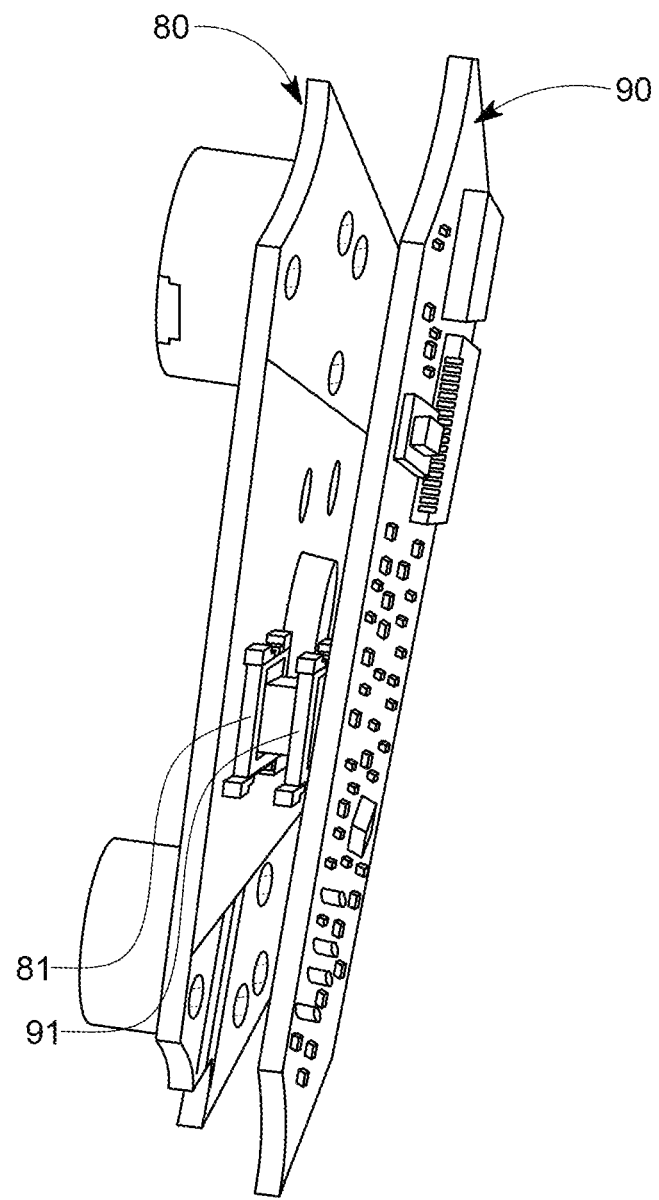
FIGS. 15-16 show connection of the upper circuit board with a lower circuit board used in the device of FIG. 1, in accordance with an embodiment of this disclosure.
Figure 16:
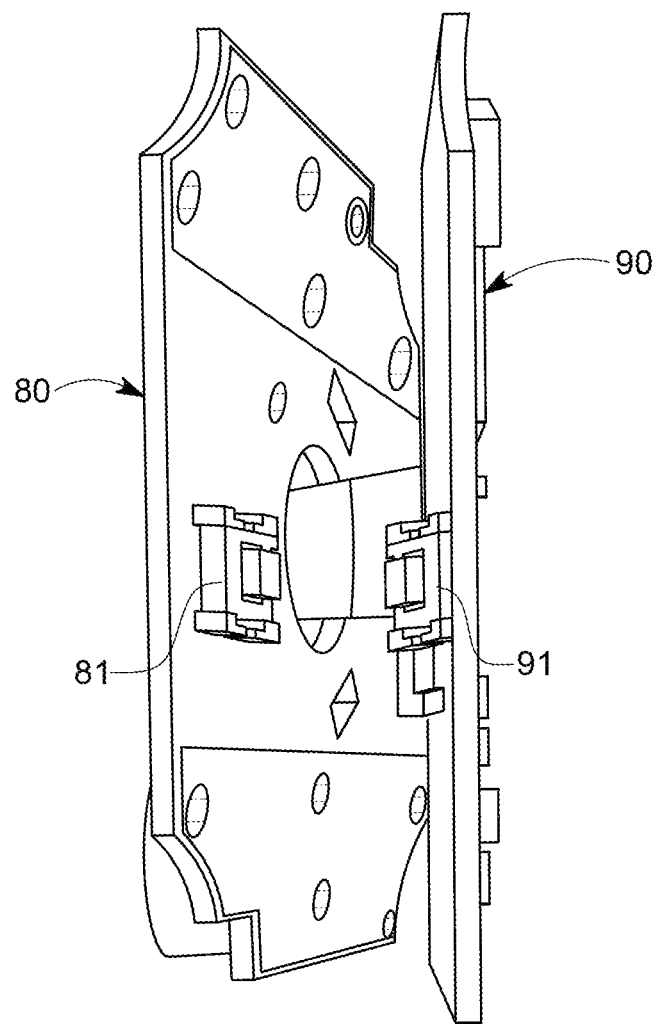
Figure 17:
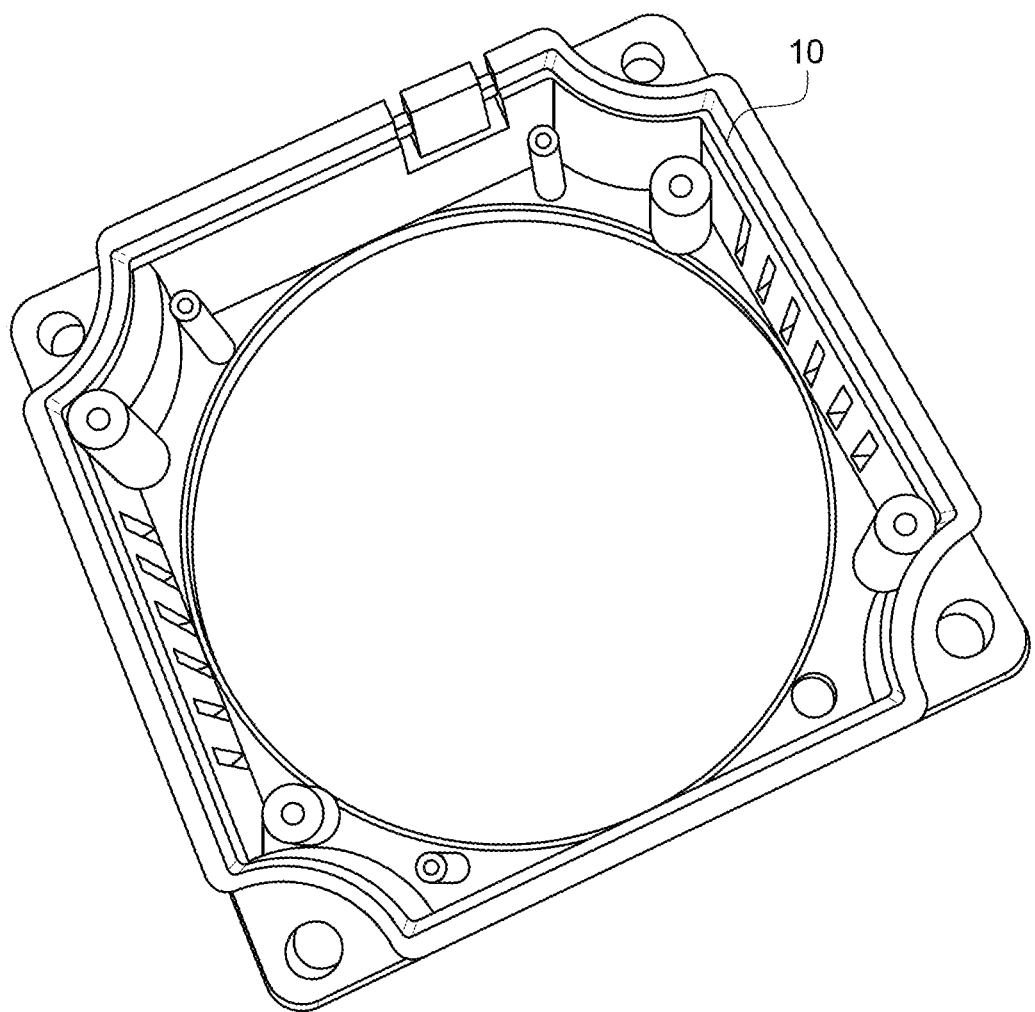
FIGS. 17-19 show underside views of the housing of the biometric information imaging and collection device of FIG. 1.
Figure 18:
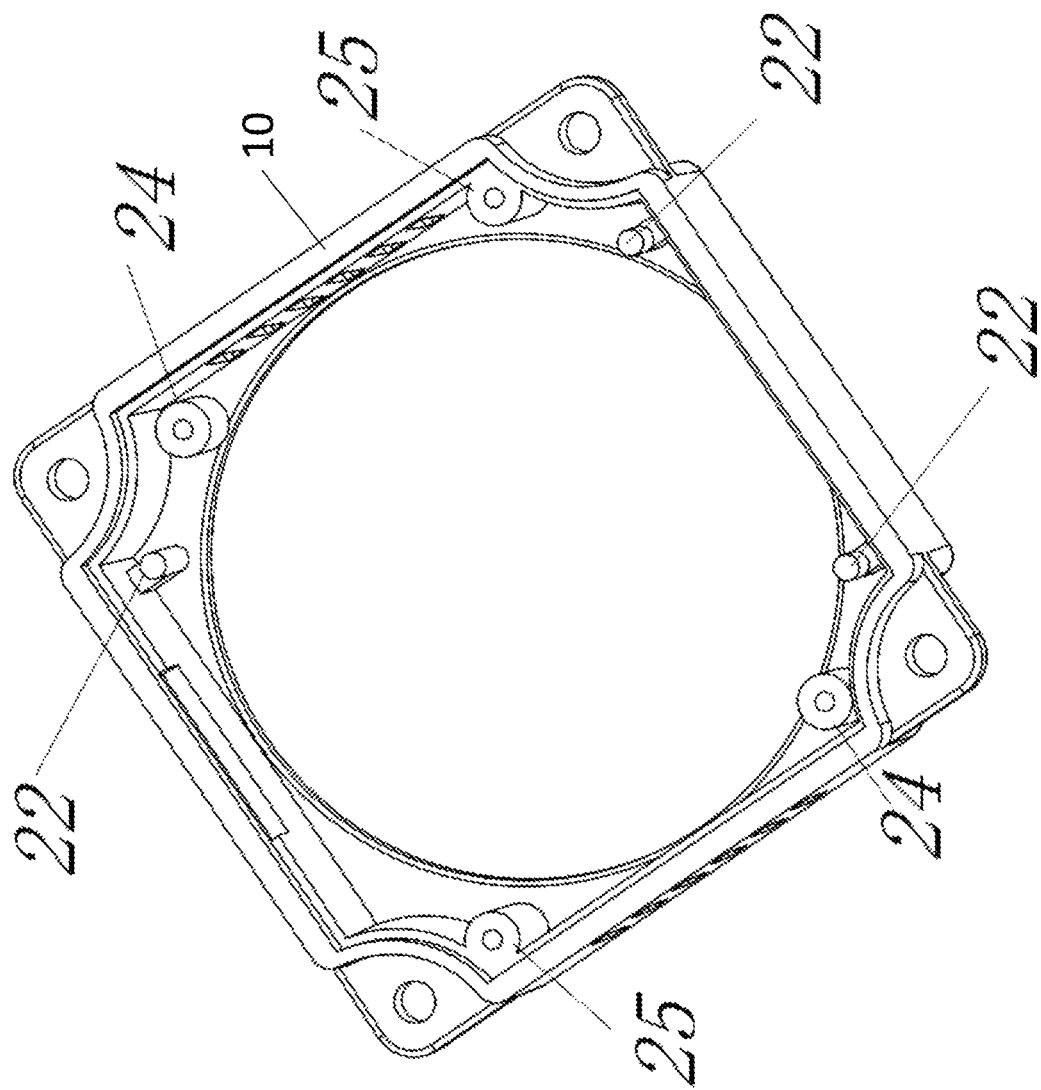
Figure 19:
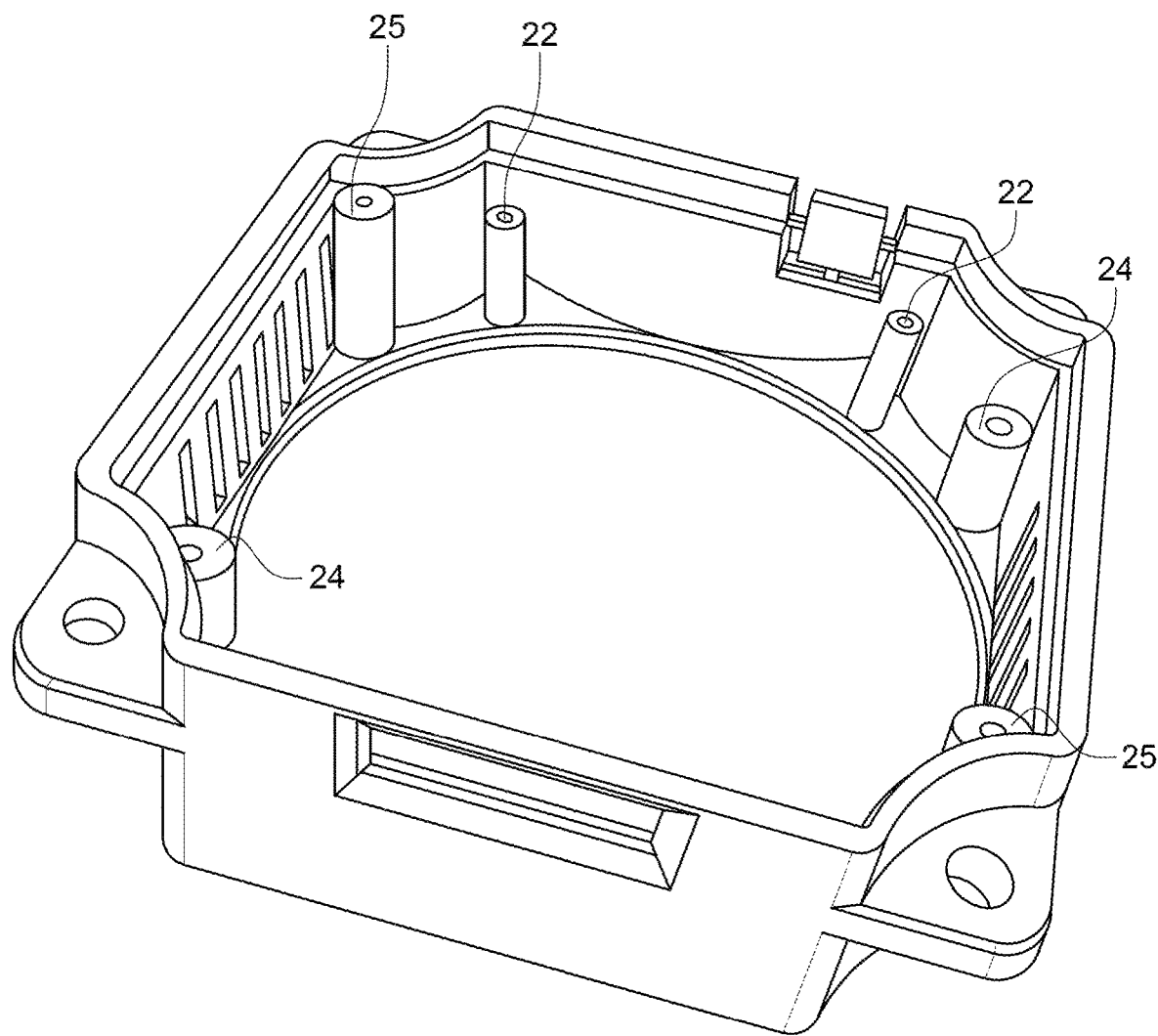

In the exemplary illustrative embodiment, two near-infrared light sources 100, each of which may be a 850 nm wavelength near-infrared LED lamp, i.e., LEDs 100, in accordance with one embodiment, are provided in the imaging and collection module 200, as well as a combination of two circuit boards, i.e., printed circuit boards (PCBs). Each light source 100 may be fixed onto a single circuit board. As shown in FIG. 5, for example, there may be an upper circuit board or upper PCB 80 (see, e.g., FIGS. 13 and 14), which may be referred to as a light board onto which the light sources 100 are fixed, and a lower circuit board or lower PCB 90. Upper PCB 80 is provided above the lower PCB 90 when mounted in the housing 10 and the imaging and collection module 200 is configured for use (e.g., see cross sectional views of FIGS. 10-12) such that cover 20 is facing upwardly for receipt of a user's palm. Upper and/or lower PCBs 80 and/or 90 may be provided in a similar shape as the housing 10, e.g., square, rectangle, polygon, circle, oval, or other shape, such that they may be aligned with the frame or walls thereof. For example, in the exemplary illustrated embodiment, the upper and lower PCBs 80 and 90 may be generally in the form of a square with beveled, rounded, and/or curved corners. However, such shapes and/or configurations are not intended to be limiting. The LEDs 100 may be provided on the upper PCB 80 (shown, for example, in FIGS. 5, 8, 10, 11, and 12) on either side of a hole 85 or opening for receiving at least part of the lens assembly 40 therethrough. In an embodiment, the LEDs 100 may be soldered on the circuit board, and the communication is through the circuit. The upper PCB 80 and lower PCB 90 are connected via a BTB (board-to-board) connection using a socket and plug, e.g., via upper PCB board BTB socket 81 and lower PCB board BTB socket 91 (see, e.g., FIGS. 9, 15, 16, 21). Upper PCB board BTB socket 81 is provided on a bottom surface of the upper PCB 80 while lower PCB board BTB socket 91 is provided on an top or upper surface of lower PCB so that the connectors/sockets 81, 91 may face each other and connect together, as shown, to establish a connection and relay information.

Figure 34:
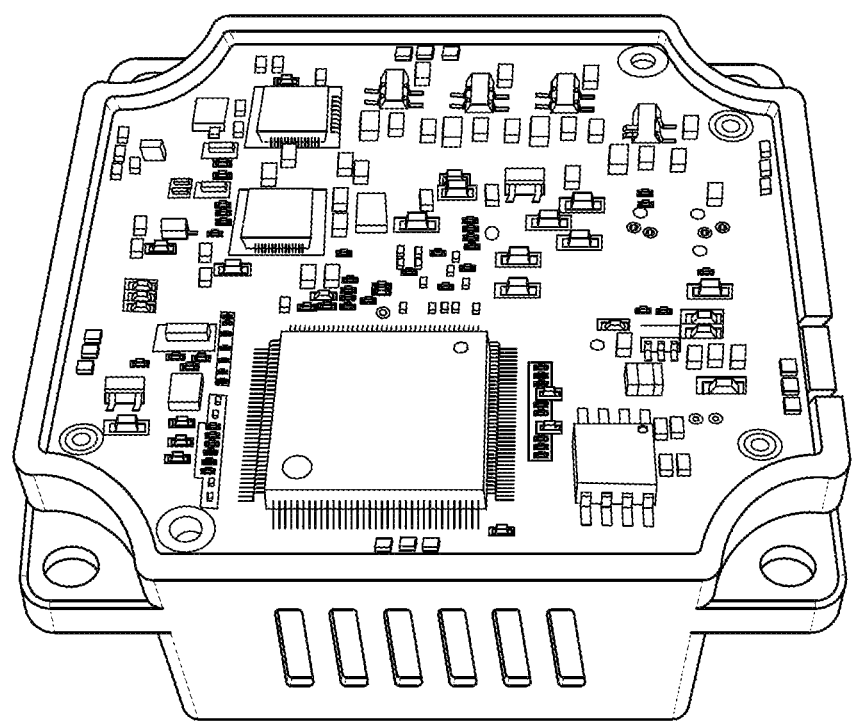
FIG. 34 shows a bottom view of the biometric information imaging and collection device in accordance with an embodiment.

In one embodiment, inside of the housing 10, as shown in the underside views of the housing 10 in FIGS. 17, 18, 19, 31, 32, and 33, there may be positioning posts 22, light board screw hole posts 24 for affixing the upper PCB/light board 80 to the housing 10, and circuit board screw hole posts 25 for affixing the lower circuit board 90 to the housing 10 on corners of the frame/housing 10. Specifically, holes and/or alignment devices ma be provided on the upper and lower PCBs 80 and 90 for aligning with the posts 22, 24, and/or 25 and securing the circuit boards within the housing 10 using screws or fasteners. Heights or lengths of screw hole posts 24 are less than heights or lengths of the screw hole posts 25 such that the PCBs 80, 90 may be provided at different levels. FIG. 34 shows a bottom view of the biometric information imaging and collection device 200, in accordance with an embodiment; more specifically, a bottom surface of the lower PCB 90 is shown, which forms a bottom of the module 200.

Figure 20:
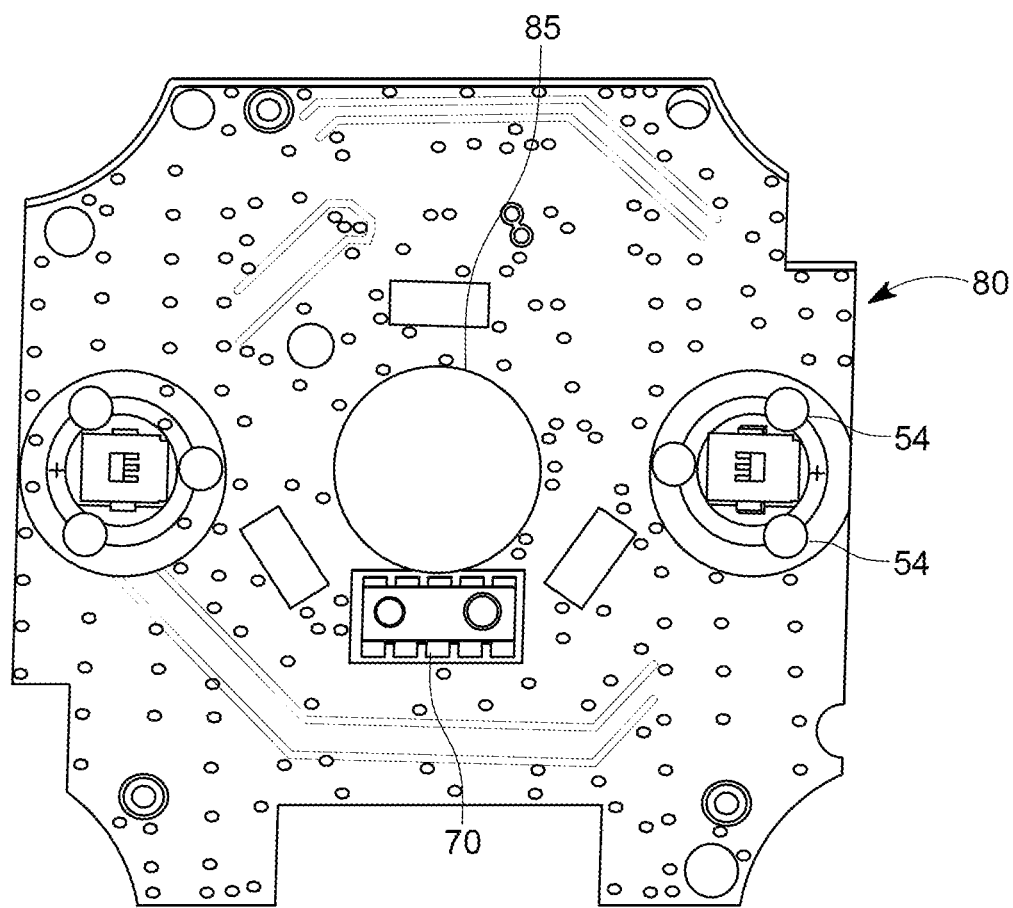
FIG. 20 shows an alternate top view of an upper circuit board used in the device of FIG. 1.
Figure 21:
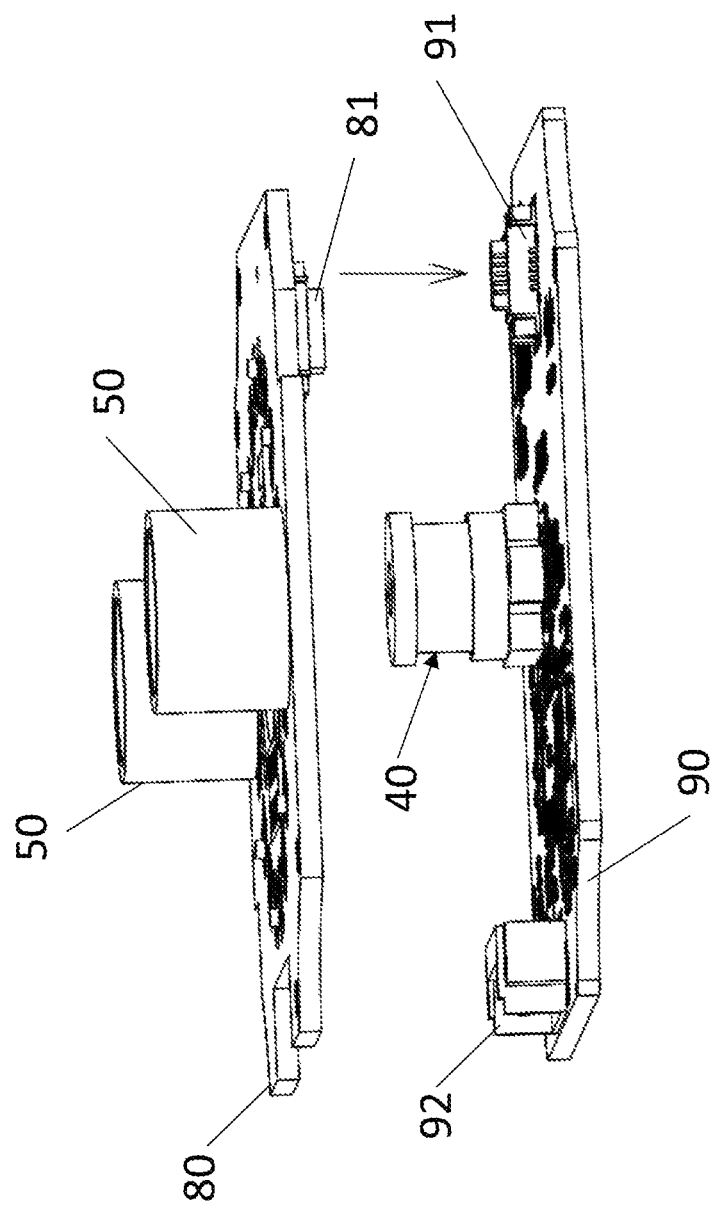
FIG. 21 show side views of an assembly of the upper circuit board and the lower circuit board in accordance with an embodiment.
Figure 22:
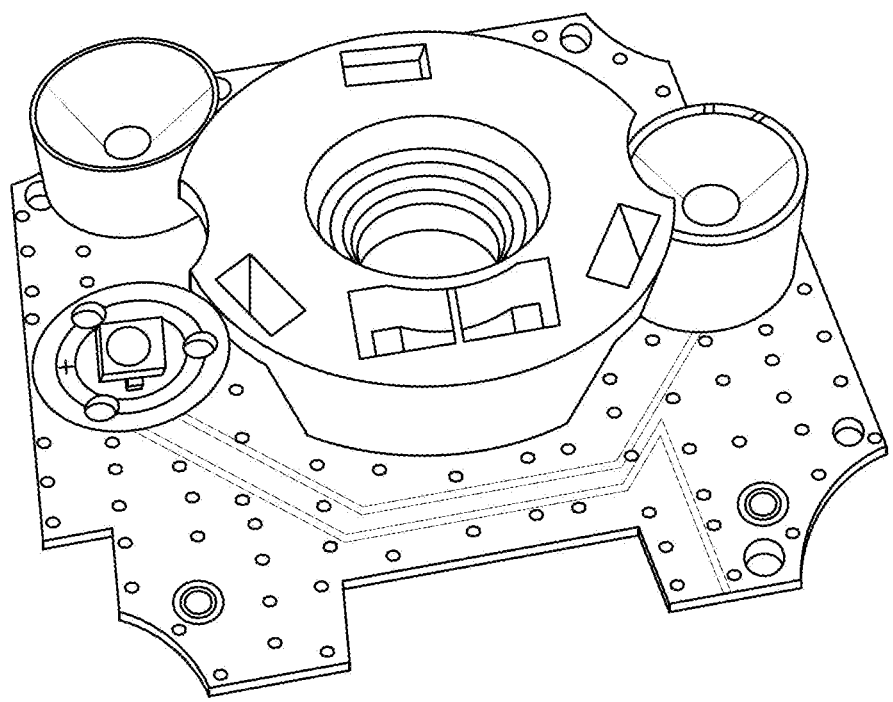
FIGS. 22-23 show an assembly of the light shielding structure with the upper circuit board in accordance with an embodiment.
Figure 23:
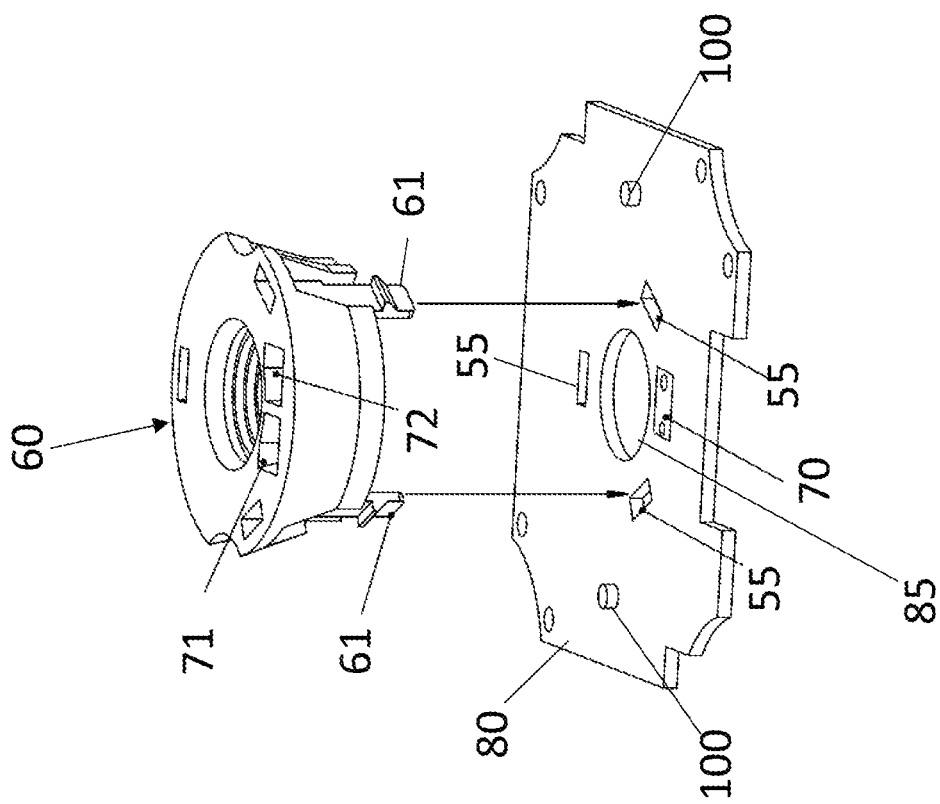
Figure 24:
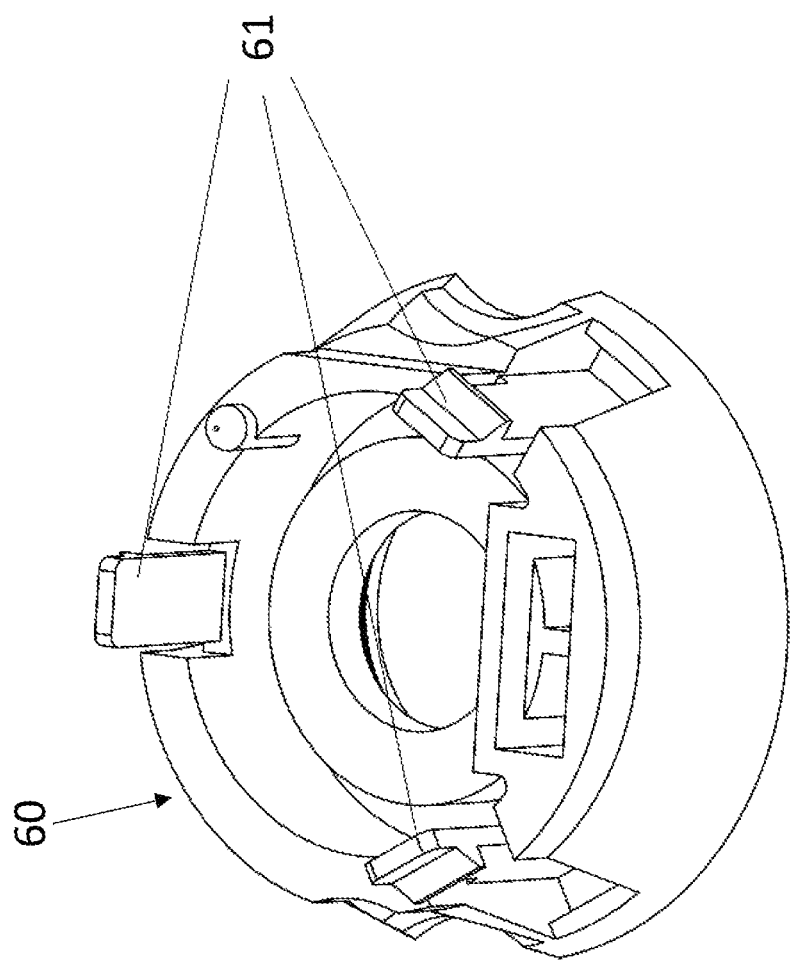
FIGS. 24-26 show underside views of the light shielding structure in accordance with an embodiment.
Figure 25:
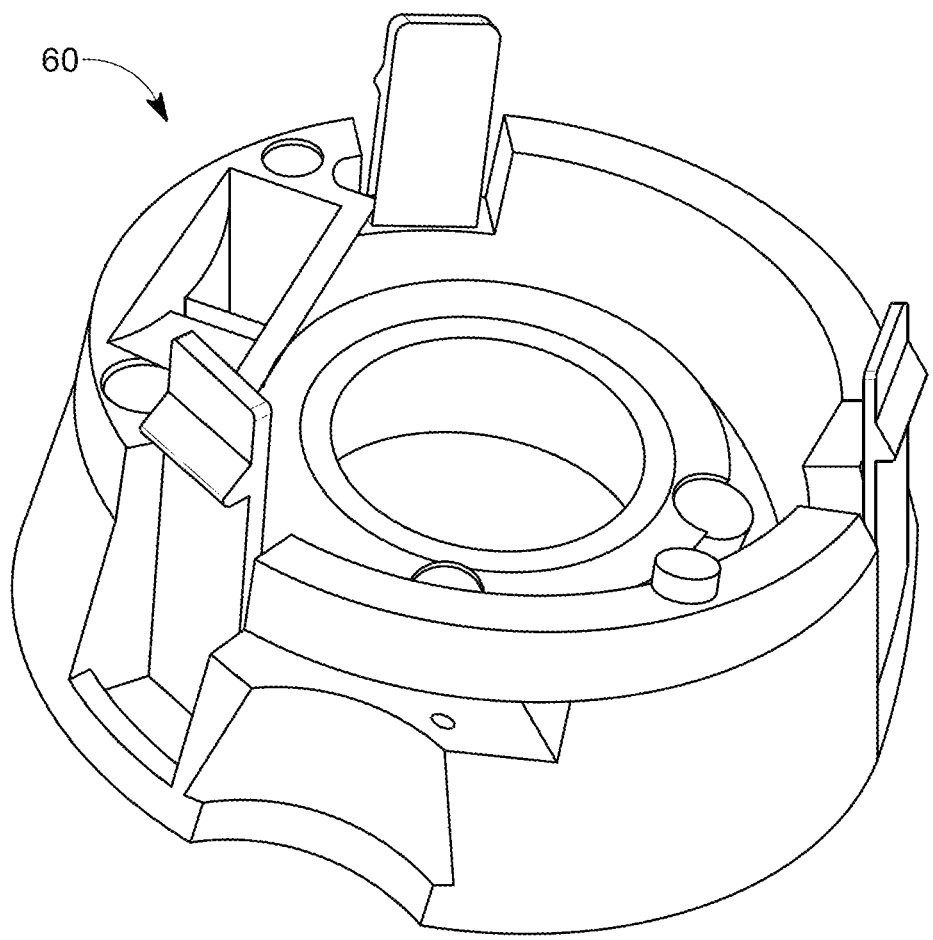
Figure 26:
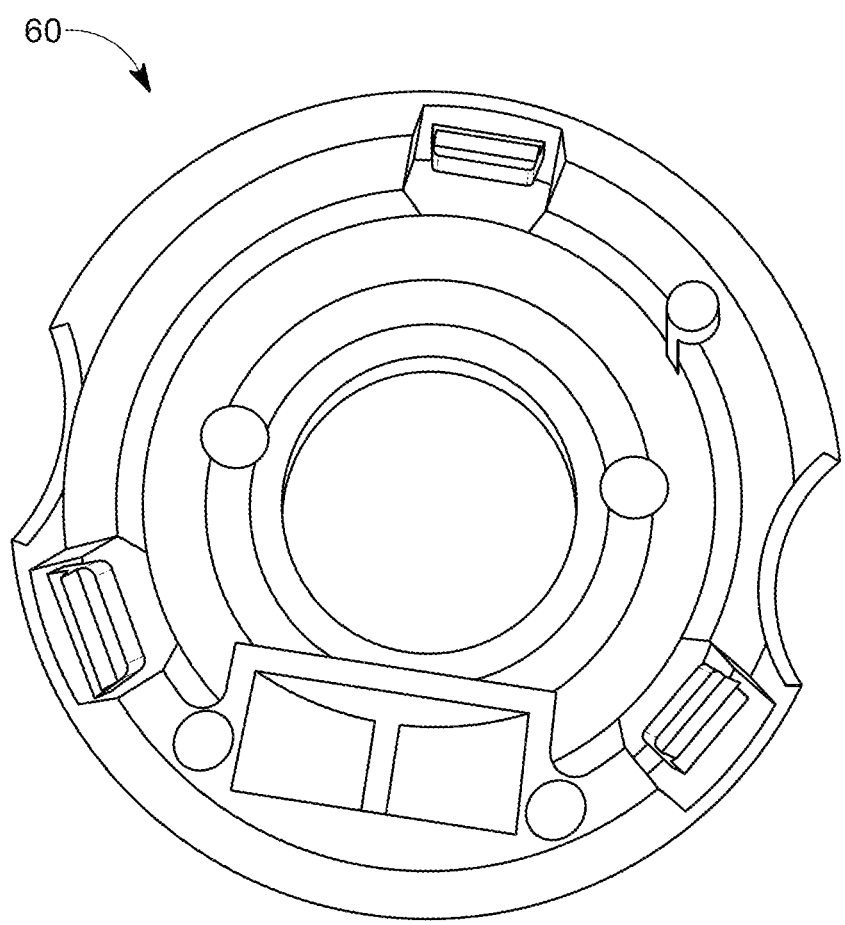

The upper circuit board 80 may also be provided with a proximity detection sensor 70 (see FIGS. 13, 20, 23) deployed for detecting palm proximity.

Figure 10:
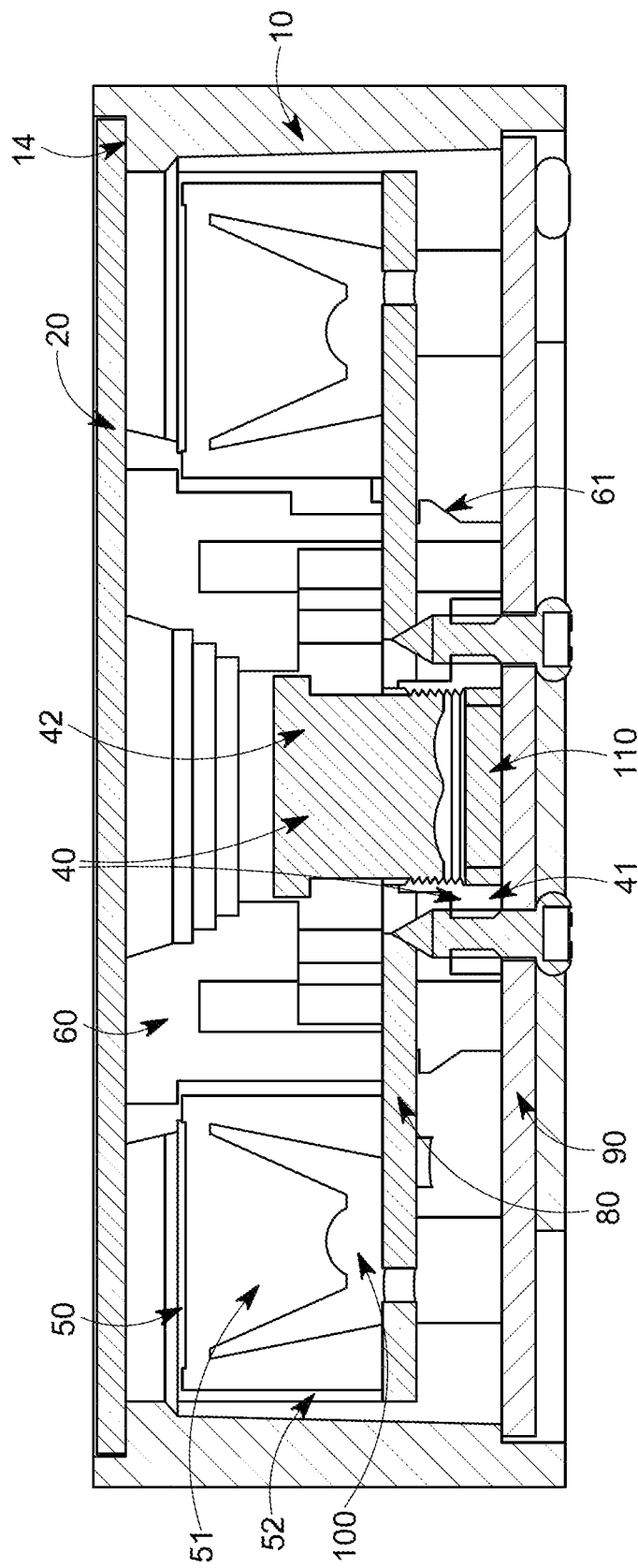
FIGS. 10 and 11 each show a cross-sectional view through a center of the device of FIG. 1.
Figure 27:
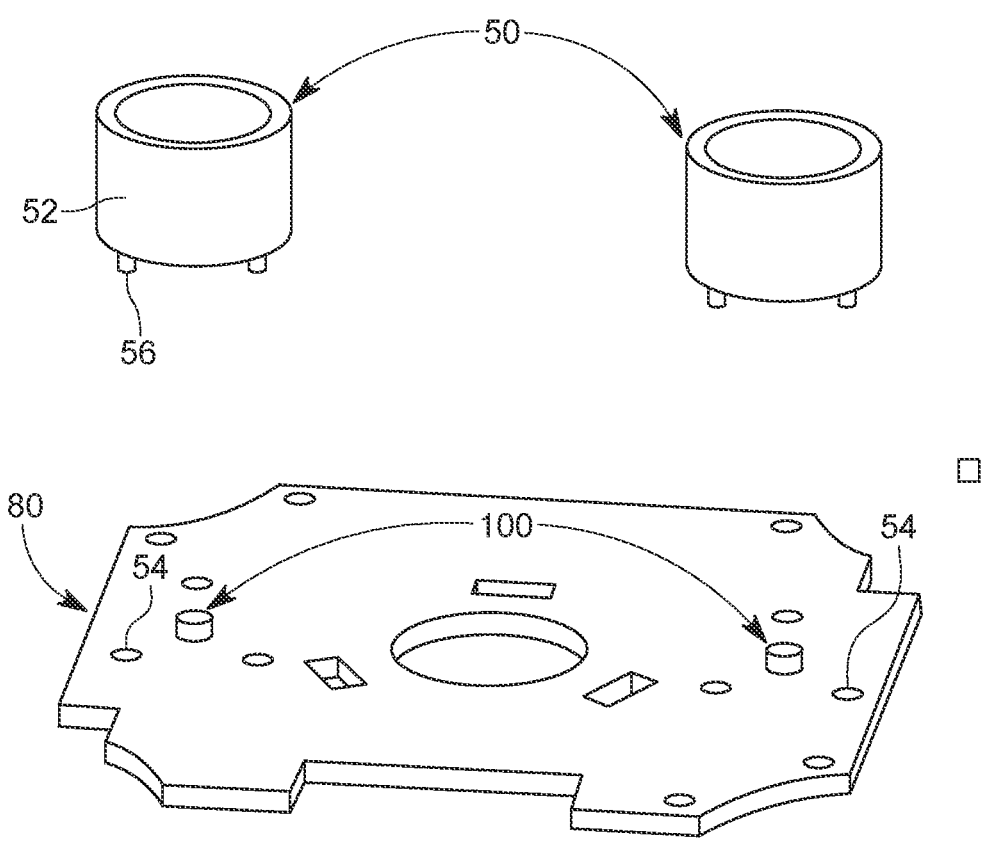
FIG. 27 shows an overhead side view of lamp cup assemblies for attachment to the upper circuit board in accordance with an embodiment.
Figure 28:
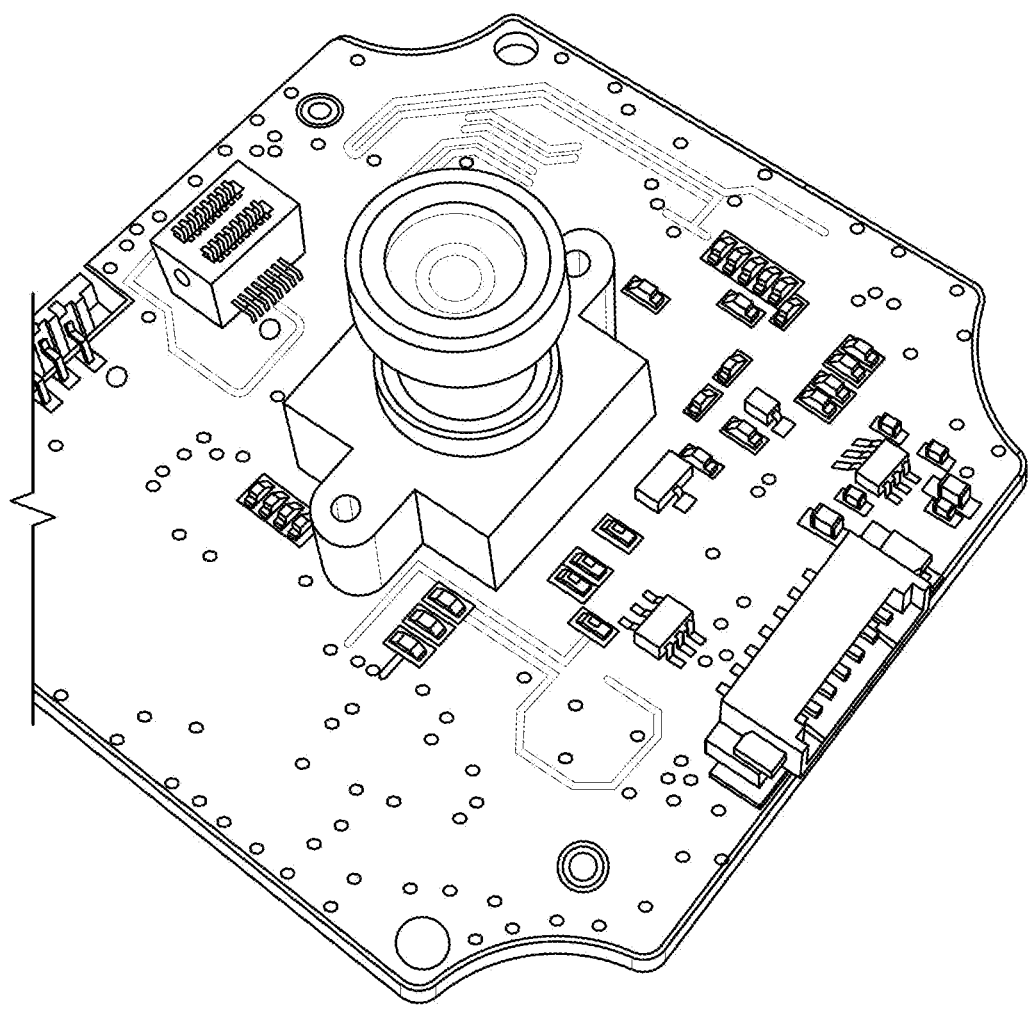
FIG. 28 shows a top view of a lens assembly and connector attached to the lower circuit board in accordance with an embodiment.
Figure 29:
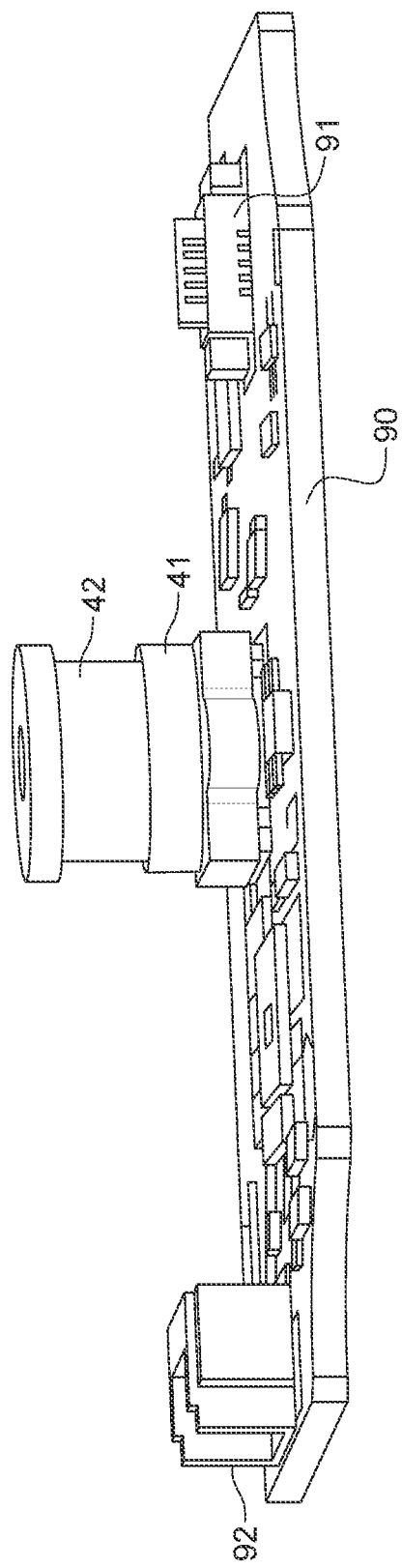
FIG. 29 shows a side view of the lower circuit board in accordance with an embodiment.
Figure 30:
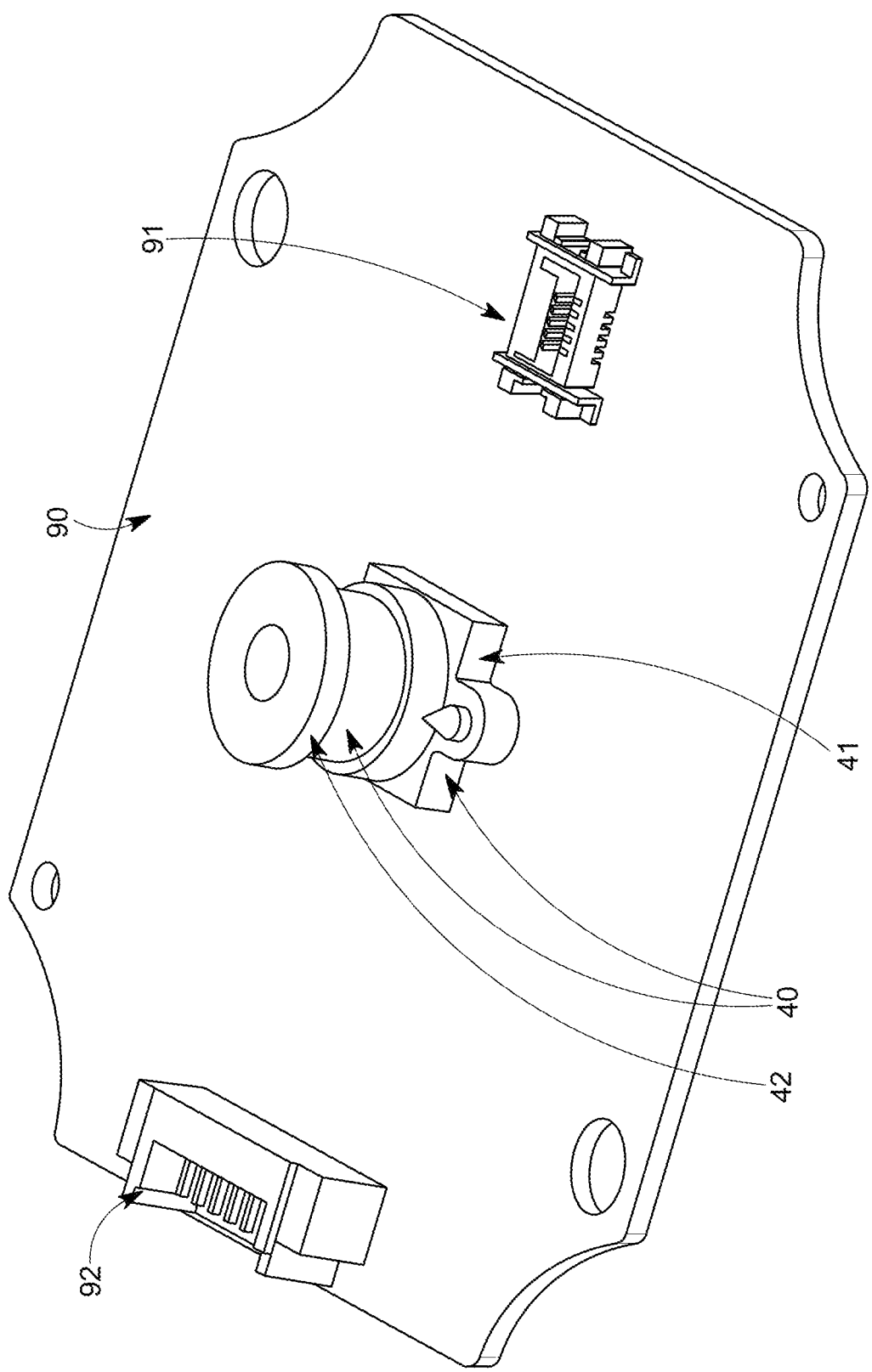
FIG. 30 shows an overhead view of the lower circuit board in accordance with an embodiment.
Figure 31:
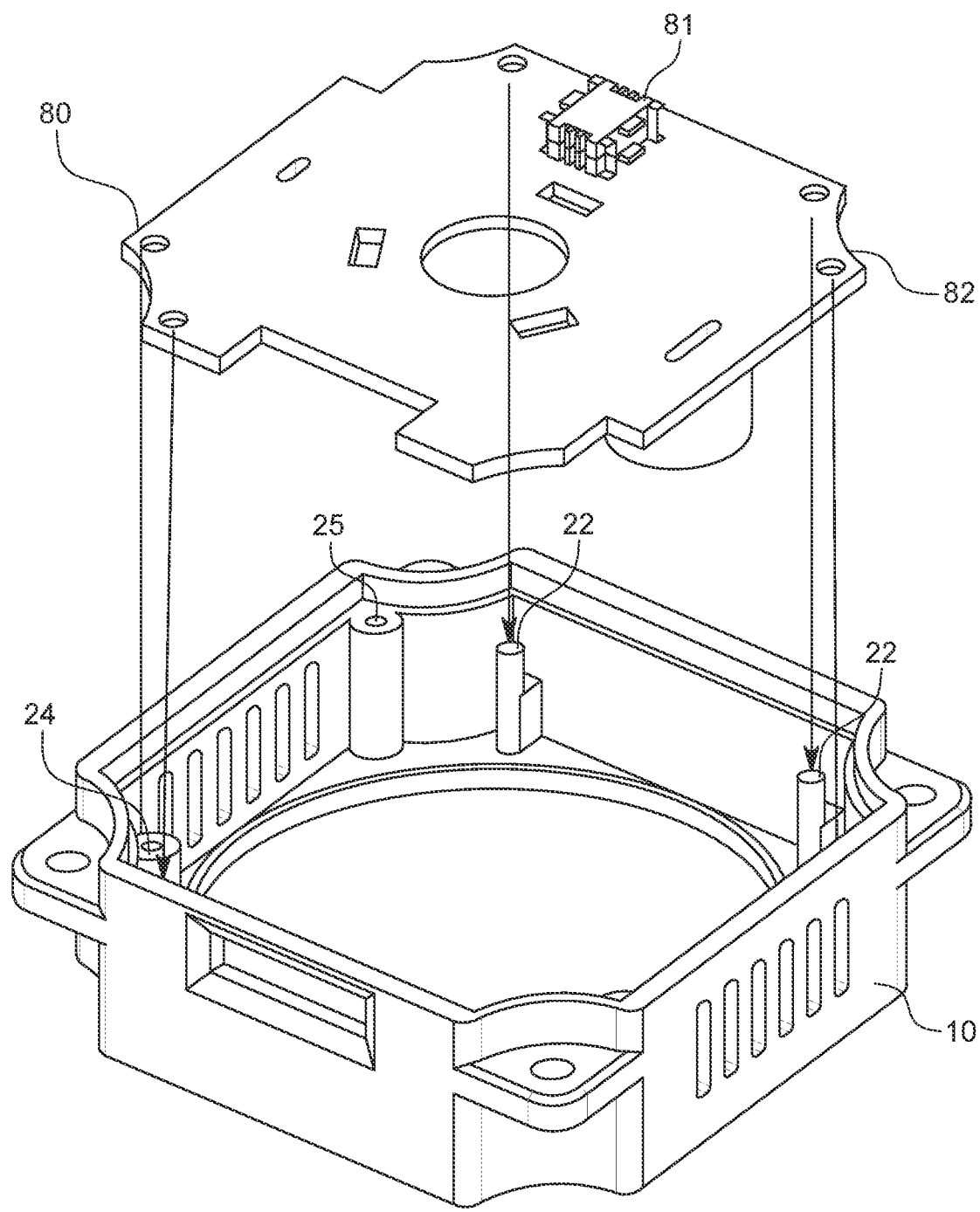
FIG. 31 shows a diagram for affixing the upper circuit board to the housing in accordance with an embodiment.
Figure 32:
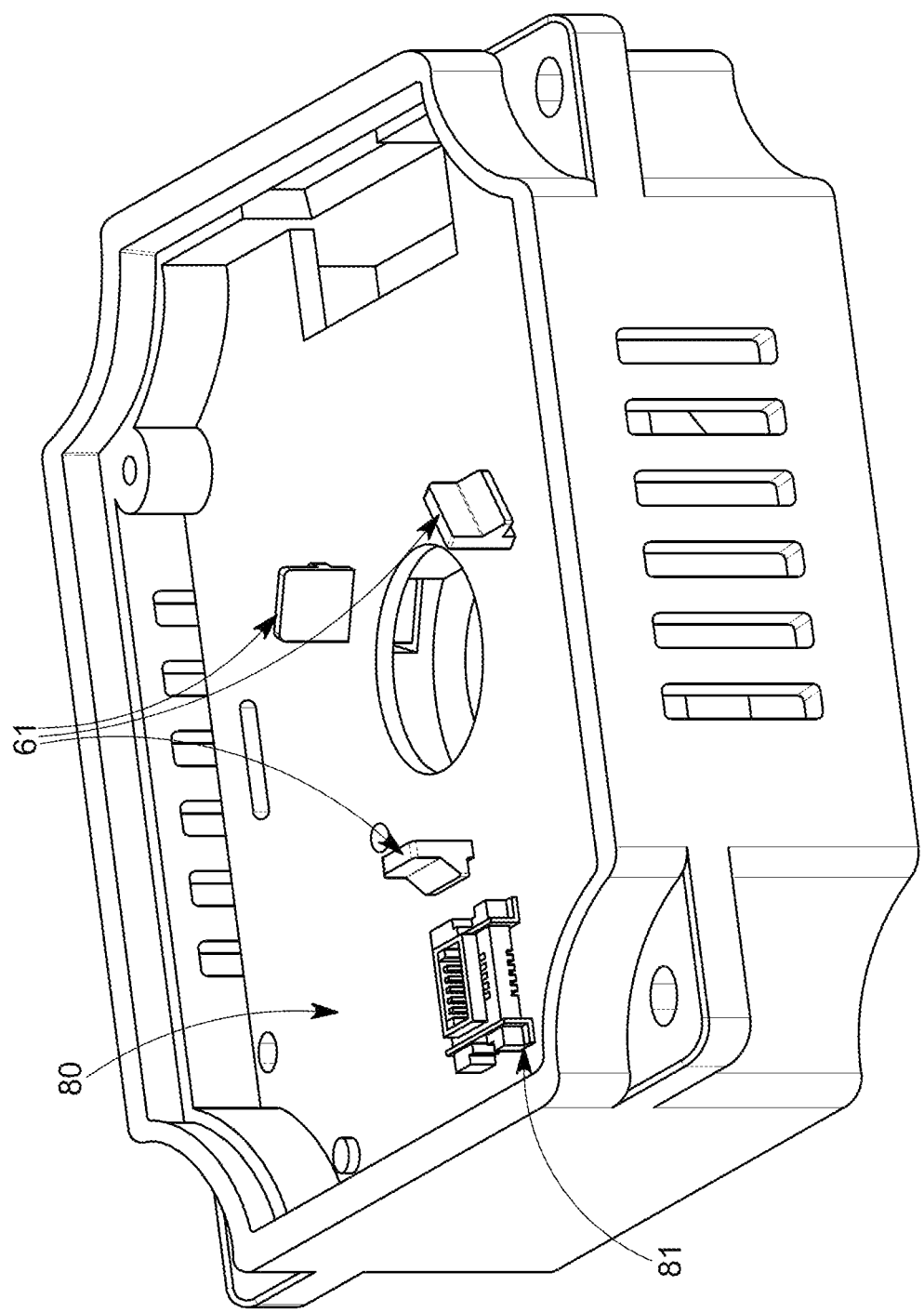
FIG. 32 shows the upper circuit board affixed to the housing in accordance with an embodiment.
Figure 33:
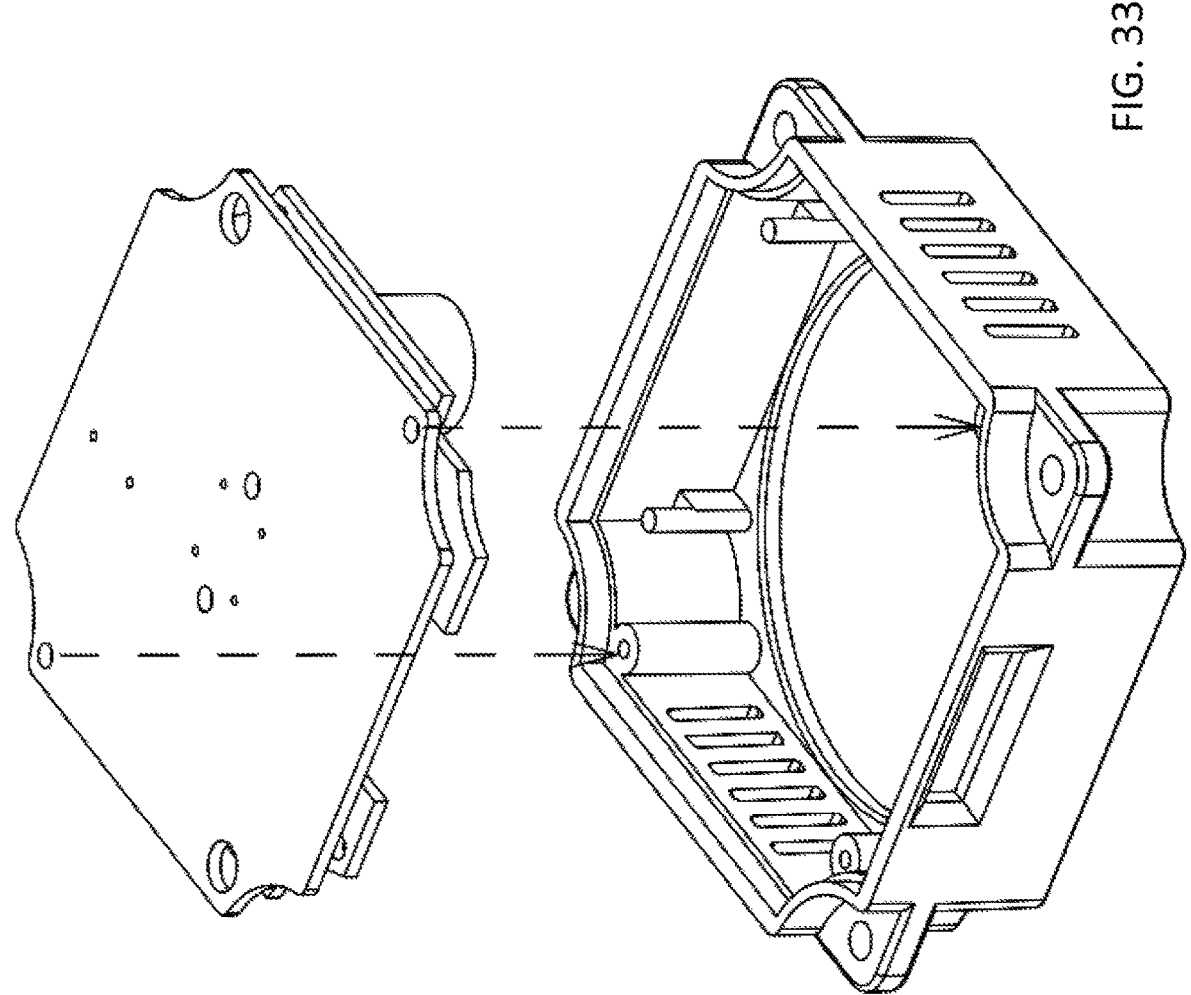
FIG. 33 shows a diagram for affixing the lower circuit board to the housing in accordance with an embodiment.

In addition, the upper PCB 80 may be designed for fixing lamp cup assemblies 50 (or light cup assemblies) around the LEDs 100, to gather near-infrared light sources, to increase the central illumination brightness, and to reduce and/or eliminate any light from the sources 100 from spreading to and reflecting from the top cover 20 and towards the lens assembly 40. See, e.g., FIGS. 5, 6, 7, 8, 10, 11, 12, 14, 21, 22, and 24, showing the exemplary illustrative embodiment which includes two lamp cup assemblies 50. Each light cup assembly 50 sits on top of and/or around an LED light 100 to guide the near-infrared light from the light source so that the brightness of the LED light intensifies in the center. As shown in FIG. 10 and FIG. 27, for example, each lamp cup assembly 50 may include a body that has a condensing plastic part 51 with a lens function, a plastic part 52 all the way around to prevent light leakage, and means for affixing the body of the assembly 50 to the upper PCB 80. The plastic part 52 of the body may be rounded or circular, for example. The condensing plastic part 51 may be designed to direct light upwardly towards cover 20, such as generally depicted in FIG. 10. In one embodiment, as illustrated, the affixing means may be feet which are inserted and/or snapped into corresponding holes provided in the upper PCB 80. For example, three fixing feet 56 may be spaced around a bottom portion of the body, where the fixing feet 56 are inserted into three fixing holes 54 on the upper PCB 80 to affix each light cup assembly 50 on the upper PCB 80. The number of feet, holes, and/or means for affixing the bodies is not intended to be limiting. In another embodiment, the affixing means may include glue/adhesive, fasteners, nails, or other means.

In an embodiment, each light cup assembly 50 may be positioned near or close to the top cover 20 to improve the lighting effect and reduce light loss. In another embodiment, a space is provided between an upper surface of each light cup assembly 50 and a lower/bottom surface of top cover 20. In yet another embodiment, each light cup assembly 50 may be positioned in contact with lower/bottom surface of top cover 20.

In yet another embodiment, lamp cup assembly(ies) 50 are optional and need not be included; that is, the module 200 may simply include light shielding structure 60 and light sources 100 without lamp cup assemblies 50.

In still yet another embodiment, lamp cup assemblies 50 may not be included because the light sources 100 may not be provided at all on the two sides of the light shielding structure 60, or the lights 100 may be very focused so that there is no concern that such light will spread to the top cover 20 and be reflected therefrom, and thus cause the aforementioned problems with regards to reflectance into the camera/lens assembly 40.

In addition to lower PCB board BTB socket 91, which is used for connection with the upper board 80, the lower PCB 90 may include lens assembly 40, an image sensor 110 and image processing chip, power supply voltage regulator unit, and lower PCB board exterior connector 92, which is accessible via socket 31 that is provided in the housing 10, for external communication and power supply purposes. Connector 92 and socket 31 (shown in FIGS. 1-3, 15, 28, 31, and 33) may be provided on one of the sides of the housing 10 for example. The socket 31 may be rectangular shaped, for example and provide access to exterior connector 92 for an outside device, such as a power source (to supply power to the module 200) and/or host computer. However, the shape, size, and location of the socket 31 and connector 92 are not intended to be limiting.

The image sensor 110 is used to convert the light focused by the lens assembly 40 to photoelectric conversion to an electrical signal, which is transmitted to the image processor through the bus. In an embodiment, the image sensor 110 may be provided within the lens base 41 (see, e.g., FIGS. 5 and 10).

Figure 11:
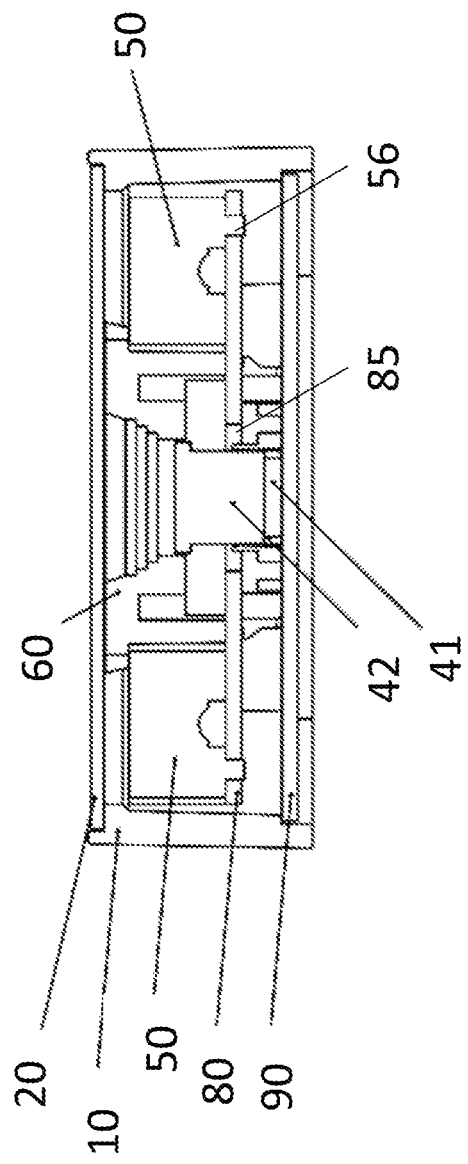

Lens assembly 40 includes a lens 42 provided on a lens base 41. In one embodiment, the lens 42 may be screwed into or onto the top of lens base 41. However, other forms of connection between the lens 42 and lens base 41 may be considered. The center axis of the lens assembly 40 is aligned with the physical center (e.g., transparent area 21) of the cover 20 and the imaging and collection module 200. Lens 42 is designed for focusing reflected light to the image sensor 110. Lens base 41 is used to affix lens 42 to an upper surface of the lower PCB 90 (e.g., see FIGS. 10-11, 21, 28, 29, and 30) such that the lens 42 extends upwardly towards cover 20 as assembled in the imaging and collection module 200. In one embodiment, the lens base 41 may be fixed to the lower PCB 90 board by screws (see, e.g., FIG. 10). At least a portion of lens 42 extends through hole or opening 85 of upper PCB 80, such as shown in FIGS. 10 and 11. The lens 42 may be assembled such that there is a gap or space between a top of the lens 42 and a bottom surface of the cover 20.

As previously mentioned, a light shielding structure 60 acts as a light blocking body to block light around the imaging unit/lens assembly 40. See, for example, FIGS. 5, 6, 7, 8, 10-12, and 22 showing such features. Light-shielding structure 60 is used to block the light source(s)/LEDs 100 built internally into the device 200 from directly entering the lens assembly 40, to prevent the proximity sensor 70 from being interfered with by the internal light sources 100 and to prevent interference to the lens assembly 40 as well. This also reduces or weakens the amount of stray light to arrive at the lens assembly sensor produced due to multiple internal reflection within the cover plate of light from un-intended light sources, especially when there exist negative impact due to the thickness of the cover plate. For example, when the influence of the thickness of the material of the cover plate 20 is reduced, as provided herein, various invalid light sources generate stray light after multiple internal reflections of the cover plate, and finally fall into the lens assembly 40. Accordingly, the light shielding structure 60 is designed to isolate transmitter and receiver channels 72, 71 (see FIG. 23, for example) for the proximity sensor 70) to avoid internal interference(s).

FIGS. 23-26 show more specific features of the light shielding structure 60, in accordance with one embodiment. The light shielding structure 60 may include an upper surface and a lower surface, with angled walls extending therebetween. In accordance with an embodiment, light shielding structure 60 uses one or more mechanical device(s) for securement to the upper PCB 80. In one embodiment, as illustrated, the light shielding structure 60 may be fixed to the upper PCB board 80 by multiple clips 61 or buckles provided on and extending from its lower surface which are inserted into and received through corresponding or matching openings 55 located in the upper PCB 80, to affix the light shielding structure on the light board 80. For example, three clips 61 or buckles may be spaced around a bottom portion of the structure 60, where the clips 61 are inserted into three openings 55 provided on the upper PCB 80 to affix and/or snap the light shielding structure 60 on the upper PCB 80 and secured via an edge provided on an end of each of the clips. The number of clips, buckles, openings, and/or devices for affixing the structures 60 is not intended to be limiting. In another embodiment, the structure 60 may be secured via glue/adhesive, fasteners, nails, or other means.

The upper surface of the light shielding structure 60 may be in close contact with and/or against the lower/bottom surface of the cover plate 20, in accordance with an embodiment. The light shielding structure 60 includes a body which is provided with an outlet or exit 72 (also called a transmitter channel or detection emission light outlet) in the form of a channel in the body for transmitting the detection light, and an inlet 71 (also called a receiver channel or detection reflection light inlet) in the form of a channel in the body for receiving the reflection light (reflected from the detection light), from and to the proximity sensor 70 that is located and provided on the upper PCB 80. The outlet 72 and the inlet 71 are aligned with and located straight above the palm proximity detector sensor 70, so as to avoid any interference by light with the proximity sensor 70, while still allowing the palm proximity sensor 70 to detect proximity of a user's palm as it approaches and/or contacts a top surface of the cover 20.

Generally, the working principle and method of use of the imaging and collection module 200 is as follows:

After the imaging device 200 is powered on, the power supply voltage regulator unit generates the working power supply for each circuit. After the image processing chip enters into normal working cycle, the system/internal function modules/proximity detection sensor 70/image sensor 110 are initialized. After the initialization is completed, the proximity detection sensor 70 is periodically queried to determine whether there is a target (i.e., palm of a user's hand) in proximity and/or approaching the module 200. When an object in proximity (e.g., palm placed over, near, or on the cover 20) is detected by the proximity detection sensor, the system enters into the palm image acquisition state.

When entering the palm image acquisition state, the LED light driving circuit controlled by the image processing chip is turned on. The LED driving circuit drives the near-infrared LED light(s) 100 with a constant current. The LED light generates an illumination light source (e.g., each with a wavelength of 850 nm) and gathers through the lamp cup 50 to increase the central area. After the illumination intensity, it shines on the palm through the (acrylic) cover 20, and shines on the palm through the (acrylic) cover after the illumination light is intensified in the center area via the light source.

Part of the near-infrared long wavelength light is reflected, through the palm surface/subcutaneous intravenous, along the same route to the lens assembly through the cover 20. Only part is reflected because the skin on a palm has a certain degree of penetration and the hemoglobin has different degrees of absorbing rates with respect to near infrared lights of different wavelengths. After being reflected by the palm surface/subcutaneous vein, part of the light returns along the original path and enters the lens assembly again through the cover plate 20. Such returned reflect light focuses on the sensor 110, and the optical signal is converted into an electrical signal, which is finally sent to the image processing chip for reception and processing, and transmits it to the host computer through the USB interface (e.g., via 31/92). Via the USB interface, the processed signal is then transmitted to the host computer, which then carries out the analysis processing of the palm image based on user instructions or preset algorithm to produce a processed result. The processed result may then be registered, compared, and/or other required operations, e.g., according to the user operation or other treatment.

In an embodiment, the top cover 20 may be formed of PC material, printing with black ink+[3M9448] double-sided adhesive. The housing 10 and/or 60 may be formed using ABS material injection molding, in accordance with an embodiment. The two circuit boards 80 and 90 may be printed circuit boards formed using any number of techniques.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will thus be seen that the features of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A biometric information imaging module for imaging palm veins comprising:
   a housing with a cover attached to a top of the housing;
   a lens assembly comprising a lens for taking images provided in the housing, the lens assembly being attached to a first circuit board;
   a light shielding structure provided around at least part of the lens of the lens assembly for shielding the lens from light reflected from the cover, the light shielding structure being connected to a second circuit board;
   an image sensor to convert light focused by the lens assembly to photoelectric conversion to an electrical signal;
   one or more light sources for providing light attached to the second circuit board; and
   a lamp cup assembly provided around each light source and attached to the second circuit board, wherein each lamp cup assembly guides the light emitted from the one or more light sources in a particular direction, and wherein the light shielding structure shields the lens from the light of the one or more light sources.

2. The imaging module according to claim 1, wherein the second circuit board is provided relatively above the first circuit board when the imaging module is positioned for use.

3. The imaging module according to claim 1, further comprising:

a proximity detection sensor to determine a target in proximity and/or approaching the cover of the module.

4. The imaging module according to claim 1, wherein the first circuit board and the second circuit board are connected via a board-to-board connection.

5. The imaging module according to claim 1, wherein the cover has a shaded area and a transparent area, wherein the transparent area is provided at a position corresponding to the lens assembly.

6. The imaging module according to claim 1, wherein an upper surface of the light shielding structure is near or against a lower surface of the cover.

7. The imaging module according to claim 1, comprising two light sources attached to the second circuit board and positioned relatively on either side of the lens assembly.

8. The imaging module according to claim 1, wherein each lamp cup assembly comprises a body with a condensing part configured to direct light towards the cover.

9. A method for imaging palm veins using a biometric information imaging module, the biometric information imaging module comprising a housing with a cover attached to a top of the housing, a lens assembly comprising a lens for taking images provided in the housing, the lens assembly being attached to a first circuit board, a light shielding structure provided around at least part of the lens of the lens assembly for shielding the lens from light reflected from the cover, the light shielding structure being connected to a second circuit board; an image sensor to convert light focused by the lens assembly to photoelectric conversion to an electrical signal; one or more light sources for providing light attached to the second circuit board; and a lamp cup assembly provided around each light source and attached to the second circuit board, the method comprising:

receiving, in the lens assembly, reflected light through the cover from a target;

shielding the lens from the light of the one or more light sources using the light shielding structure;

sensing via the image sensor the reflected light from said lens assembly;

converting, with the image sensor, an optical signal from the light focused by the lens assembly via photoelectric conversion to an electrical signal for processing;

generating illumination light using the one or more light sources; and guiding illumination light emitted from the one or more light sources in a particular direction using each lamp cup assembly.

10. The method according to claim 9, further comprising:

providing power to the biometric information imaging module; and providing the biometric information imaging module into a palm acquisition state.

11. A method for imaging palm veins upon detecting proximity of a user's palm, comprising:

periodically querying a proximity detection sensor in connection with a biometric imaging module to determine that a target is in proximity and/or approaching a cover of the biometric information imaging module;

detecting, by the proximity detection sensor, the proximity of the target; and activating the biometric information imaging module to enter into a palm acquisition state.

12. The method according to claim 9, wherein the biometric information imaging module comprises two light sources attached to the second circuit board and positioned relatively on either side of the lens assembly, and wherein the generating illumination light utilizes the two light sources.

13. The method according to claim 9, wherein each lamp cup assembly comprises a body with a condensing part, and wherein the guiding illumination light using each lamp cup assembly comprises directing said illumination light towards the cover.

14. The method according to claim 9, wherein the one or more light sources of the biometric imaging module are attached to the second circuit board on opposite sides of the light shielding structure.

15. The imaging module according to claim 1, wherein the one or more light sources are attached to the second circuit board on opposite sides of the light shielding structure.

* * * * *